(12) United States Patent
Omaru et al.

(10) Patent No.: US 6,277,522 B1
(45) Date of Patent: Aug. 21, 2001

(54) NON-AQUEOUS ELECTROLYTE SECONDARY CELL CATHODE MATERIAL AND NON-AQUEOUS ELECTROLYTE SECONDARY CELL EMPLOYING THE CATHODE MATERIAL

(75) Inventors: Atsuo Omaru; Naoyuki Nakajima; Masayuki Nagamine, all of Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/011,781
(22) PCT Filed: Jun. 27, 1997
(86) PCT No.: PCT/JP97/02247
§ 371 Date: May 3, 1999
§ 102(e) Date: May 3, 1999
(87) PCT Pub. No.: WO98/00876
PCT Pub. Date: Jan. 8, 1998

(30) Foreign Application Priority Data

Jun. 28, 1996 (JP) .................................................. 8-188421

(51) Int. Cl.$^7$ ....................................................... H01M 4/58
(52) U.S. Cl. .................................. 429/231.8; 429/218.1; 429/231.4
(58) Field of Search .............................. 429/231.8, 218.1, 429/231.4

(56) References Cited

FOREIGN PATENT DOCUMENTS

| | | |
|---|---|---|
| 0 644 603 A1 | 3/1995 | (EP) . |
| 0 675 555 A1 | 10/1995 | (EP) . |
| 0 688 057 A1 | 12/1995 | (EP) . |
| 0698 935 A1 | 2/1996 | (EP) . |
| 7-22023 | 1/1995 | (JP) . |
| 7-282811 | 10/1995 | (JP) . |

OTHER PUBLICATIONS

09293504; 26/04/96; Patent Abstract of Japan.
09306488; 13/05/96; Patent Abstract of Japan.

*Primary Examiner*—Laura Weiner
(74) *Attorney, Agent, or Firm*—Sonnenschein, Nath & Rosenthal

(57) ABSTRACT

Carbon fiber having cross sectional shape which satisfies area replenishment rate of 0.8 or more is used as anode material for non-aqueous electrolyte secondary battery. Alternatively, since value of fractal dimension of cross section high order structure of the random radial type carbon fiber can be utilized as material parameter for evaluating the cross sectional structure, carbon fiber in which the value of the fractal dimension is caused to fall within the range from 1.1 to 1.8 and the crystallinity has been controlled such that it falls within reasonable range is used as anode material for non-aqueous electrolyte secondary battery. Further, carbon fiber having cross section high order structure such that the central portion is radial type structure and the surface layer portion is random radial type structure is used as anode material for non-aqueous electrolyte secondary battery. Furthermore, it is also effective to use carbon fiber having notch structure at the cross section. In addition, graphitized carbon fiber having cross sectional portions different in the crystal structure at predetermined periods in the fiber length direction is made up. By crushing the graphitized carbon fiber thus obtained, carbon fiber crushed powder having less unevenness and predetermined aspect ratio can be easily made up.

7 Claims, 16 Drawing Sheets

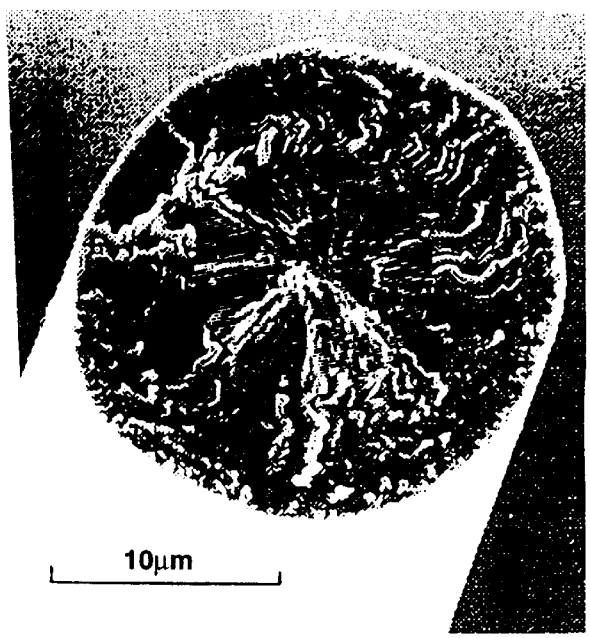
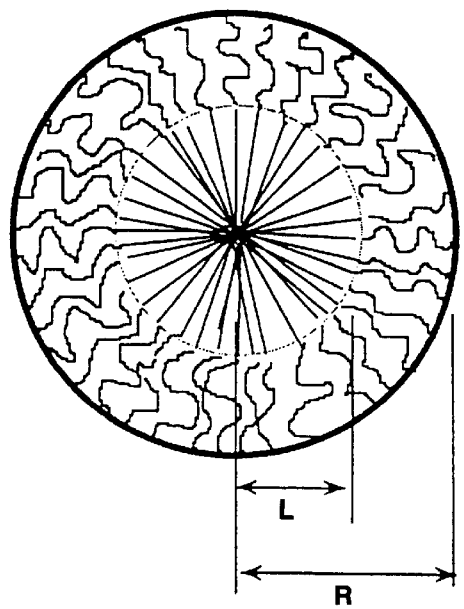
FIG.1A  FIG.1B
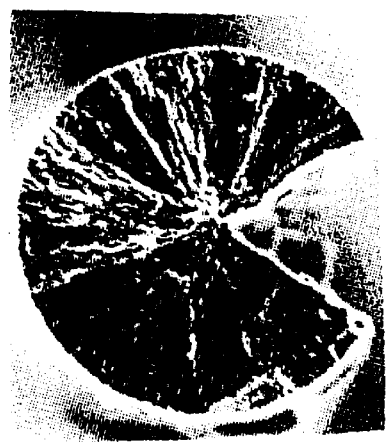
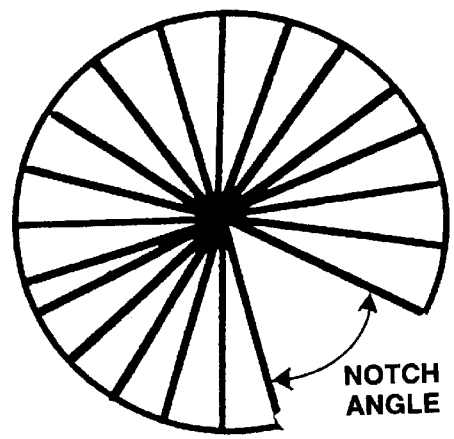
FIG.2A  FIG.2B

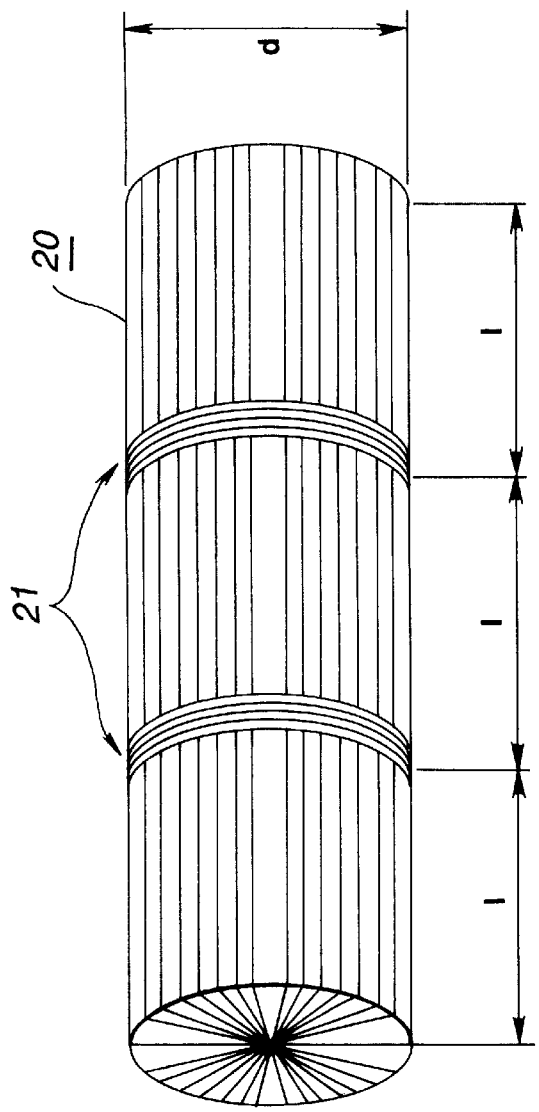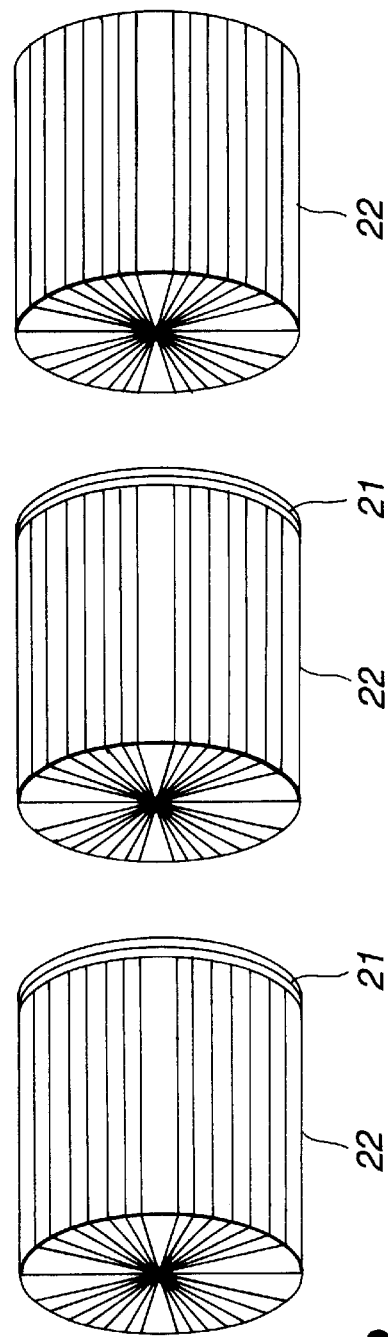
FIG.4A
FIG.4B

NON-AQUEOUS ELECTROLYTE SECONDARY CELL CATHODE MATERIAL AND NON-AQUEOUS ELECTROLYTE SECONDARY CELL EMPLOYING THE CATHODE MATERIAL

TECHNICAL FIELD

This invention relates to anode material for a non-aqueous electrolyte secondary battery, which consists of carbon material particularly carbon in fiber form, and further relates to a non-aqueous electrolyte secondary battery using such anode material.

BACKGROUND ART

Recent electronic technologies have conspicuously progressed so that, e.g., miniaturization and/or light weight of electronic equipments can be realized in succession. Followed by this, also for batteries as portable power supply (supply) (source), there has been still more increased demand of miniaturization, light weight and high energy density.

Hitherto, as the secondary battery of general use, aqueous solution system batteries such as lead battery, or nickel/cadmium battery, etc. are the main current. These batteries can be satisfied to some extent in the cycle characteristic, but it cannot be said that they have satisfactory characteristic in points of battery weight and the energy density.

On the other hand, studies/developments of non-aqueous electrolyte secondary batteries using lithium or lithium alloy as anode have been extensively carried out in recent years. Such batteries have excellent characteristics of high energy density, small self-discharge and light weight, but have the drawback that lithium is crystal-grown in dendrite form at the time of charging followed by development (progress) of the charge/discharge cycle and reaches the cathode so that there results the internal short. This is great hindrance to realization of practical use.

As a battery which solves such problem, non-aqueous electrolyte secondary batteries using carbon material as the anode, which are so called lithium ion secondary battery, have been proposed and remarked. The lithium ion secondary battery utilizes doping/undoping of lithium into portion between carbon layers as the anode reaction. Even if charge/discharge cycle is developed, precipitation of crystal in dendrite form cannot be observed at the time of charging. Thus, such batteries exhibit satisfactory charge/discharge cycle characteristic.

In this case, there are several carbon materials as carbon material which can be used as the anode of the lithium ion secondary battery. Among them, material which has been first put into practical use is coke and glass-shaped carbon. These materials are material having low crystallinity obtained after undergone heat-treatment at relatively low temperature, and has been commercialized as practical battery by using electrolytic solution mainly consisting of propylene carbon (PC). Further, also in graphite or the like which could not be used as anode when PC is used as main solvent, electrolytic solution mainly consisting of ethylene carbon (EC) is used so that arrival to usable level has been realized.

As the graphite or the like, graphite in a scale form can be relatively easily obtained. Hitherto, such graphite or the like has been widely used as conductive material for alkali battery. This graphite or the like advantageously high crystallinity and high true density as compared to non-easily graphitized carbon material. Accordingly, if the anode is constituted by the graphite or the like, high electrode filling (packing ability can be obtained and the energy density of the battery is caused to be high. From this fact, it can be said that the graphite or the like is greatly expected material as the anode material.

Meanwhile, most of the carbon materials exhibit form such as block form. In the case where such carbon materials are actually used as the battery, they are crushed or pulverized and are used in powder form.

For this reason, even if the structure of carbon material is controlled so that the carbon material takes macro form or micro form by, e.g., physical or chemical treatment (processing), there are actual circumstances where the structure is disturbed by crushing, so its effect cannot be sufficiently obtained.

On the contrary, in the case of carbon in fiber form (carbon fiber) obtained by carbonizing organic material in fiber form, it is easy to relatively control the carbon structure and there is no necessity of crushing. For this reason, such carbon fiber is advantageous when application to the anode is assumed.

The structure of the carbon fiber greatly reflects the structure of organic fiber which is precursor.

As organic fiber, there are organic fibers in which polymer such as polyacrylonitrile, etc. is caused to be material, and organic fibers in which pitch or the like such as petroleum pitch, etc. and mesophase pitch caused to be oriented are caused to be material, etc. These organic fibers all take fiber shape after undergone fiber-forming.

By carbonizing these organic fibers, carbon fibers can be obtained. However, since they are fused when heat-treated at the time of carbonization so that there results broken fiber structure, they are carbonized after infusible processing is ordinarily implemented to the fiber surface by oxidation, etc.

The carbon fiber obtained in this way has cross sectional structure originating in the organic material fiber structure and exhibits high order structure of, such as, for example, the type oriented in concentrical form which is so called onion-skin type, the radially oriented radial type and isotropically random type, etc. Graphite fibers obtained by graphitizing these carbon fibers have high true density and also have high crystallinity.

However, also in the above-described carbon fibers, it cannot be said that there is no problem.

Since, e.g., most of carbon fibers have circular cross section nearly equal to complete round, in the case where they are filled (packed) into the electrode, the so-called dead space takes place. Under the circumstances where there is increased requirement of high energy density with development of electronic equipments, the above-mentioned dead space constitutes great problem.

Moreover, in lithium ion secondary battery, since the intercalation reaction is the main anode reaction, it is known that according as crystallinity of anode carbon material becomes higher, the capacity becomes large. In the carbon fiber, with respect to the fiber cross sectional structure of the radial type, crystallinity is easy to be improved, whereas crack is easy to take place in parallel to fiber axis by expansion/contraction at the time of charge/discharge and the fiber structure is easy to be broken. Accordingly, in the carbon fiber of the radial type structure, large capacity can be obtained, but reversibility of the charge/discharge cycle is not sufficient.

For this reason, as the anode carbon material, carbon fibers of the random radial type in which the radial structure and the random structure are mixed are the main current. However, since the fiber diameter is small and the cross section takes circular shape, rearrangement of the carbon layer surface is difficult to take place, thus making it possible to have high crystallinity, e.g., as in the case of graphite in the scale form.

Further, in the case of the carbon fiber, since the orientation state of the cross section becomes uneven in the fiber length direction, there is also the inconvenience that crack is apt to take place in the fiber axis direction at the time of crushing and cutting. Since the carbon fiber is not in block form as in the case of the ordinary graphite material, crushing is not required under strong condition. However, it is necessary to finely crush and cut carbon fiber so that a fixed (predetermined) aspect ratio is provided. This crushing/cutting of carbon fiber involves various difficulties as compared to crushing of carbon material in block form. Thus, as previously described, not only crack is easy to take place, but also it is difficult to allow material parameter such as aspect ratio, etc. to be fixed.

From these reason, there is nothing but to say that the battery made up by using conventional graphitized carbon fiber has insufficient capacity in the existing states and has low industrial reliability.

DISCLOSURE OF THE INVENTION

An object of this invention is to provide more practical carbon in fiber form (carbon fiber) which is high in the electrode filling (packing) ability, is excellent in crystallinity, is easy to be cut, and has less variations (unevenness) of material parameter, and to thereby provide a non-aqueous electrolyte secondary battery of high energy density and high reliability.

The inventors of this application have obtained various findings as the result of the fact that they have energetically and repeatedly studied. This invention has been completed on the basis of these findings, and contemplates to attain the above-described object by implementing various improvements to carbon fiber.

Namely, first of all, the cross sectional shape of the carbon fiber is caused to be such a shape that area replenishment rate (degree) (value obtained by dividing area of cross section of carbon fiber by product of long side and short side of circumscribed rectangle which takes the minimum area in the case where the cross section of the carbon fiber is encompassed by the circumscribed rectangle) satisfies a specific range, 0.8 or more in more practical sense.

Thus, anode material having high electrode filling (packing) ability and having less dead space is obtained.

Moreover, at this time, the cross sectional shape is caused to be such a shape to satisfy a specific range of circularity, whereby the cycle characteristic is further improved.

Secondly, since value of fractal dimension determined by the fractal analysis of cross sectional high order structure of random radial type carbon fiber can be utilized as material parameter for evaluating cross sectional structure, this value is caused to fall within a specific range (from 1.1 to 1.8) to conduct a control such that crystallinity is caused to fall within a reasonable range.

Thus, high capacity carbon fiber which is less in variations of the charge/discharge ability and is satisfactory in the charge/discharge cycle reversibility can be realized.

Thirdly, in the high order structure of the carbon fiber, the central portion is caused to be of radial type structure and the surface layer portion is caused to be of the random radial type structure.

Thus, carbon fiber having both strength tolerable to expansion/contraction at the time of charge/discharge and high capacity can be realized.

Fourthly, the cross sectional shape of the carbon fiber is caused to be of notch structure including notch (cut portion). The notch angle is caused to be 2° to 150°.

Thus, even in the case where carbon fiber of the radial type structure is employed, carbon fiber having high capacity and strength tolerable to expansion/contraction at the time of charge/discharge can be realized.

Fifthly, graphitized carbon fiber having cross sectional portions in the crystal structure different from each other at predetermined period (interval) in the fiber length direction is made up. Then, the graphitized carbon fiber thus obtained is crushed.

Thus, carbon fiber crushed powder having less unevenness and a fixed aspect ratio can be easily made up.

BRIEF DESCRIPTION OF THE DRAWINGS

FIG. 1 is a view showing cross section of carbon fiber in which the central portion is of radial type structure and the surface layer portion is of random radial type structure.

FIG. 2 is a view showing cross sectional shape of carbon fiber having notch structure.

FIG. 4 is a schematic perspective view showing graphitized carbon fiber having cross sectional portions different in the crystal structure at predetermined period in the fiber length direction and carbon fiber crushed powder obtained by crushing the same.

BEST MODE FOR CARRYING OUT THE INVENTION

Figure 3:
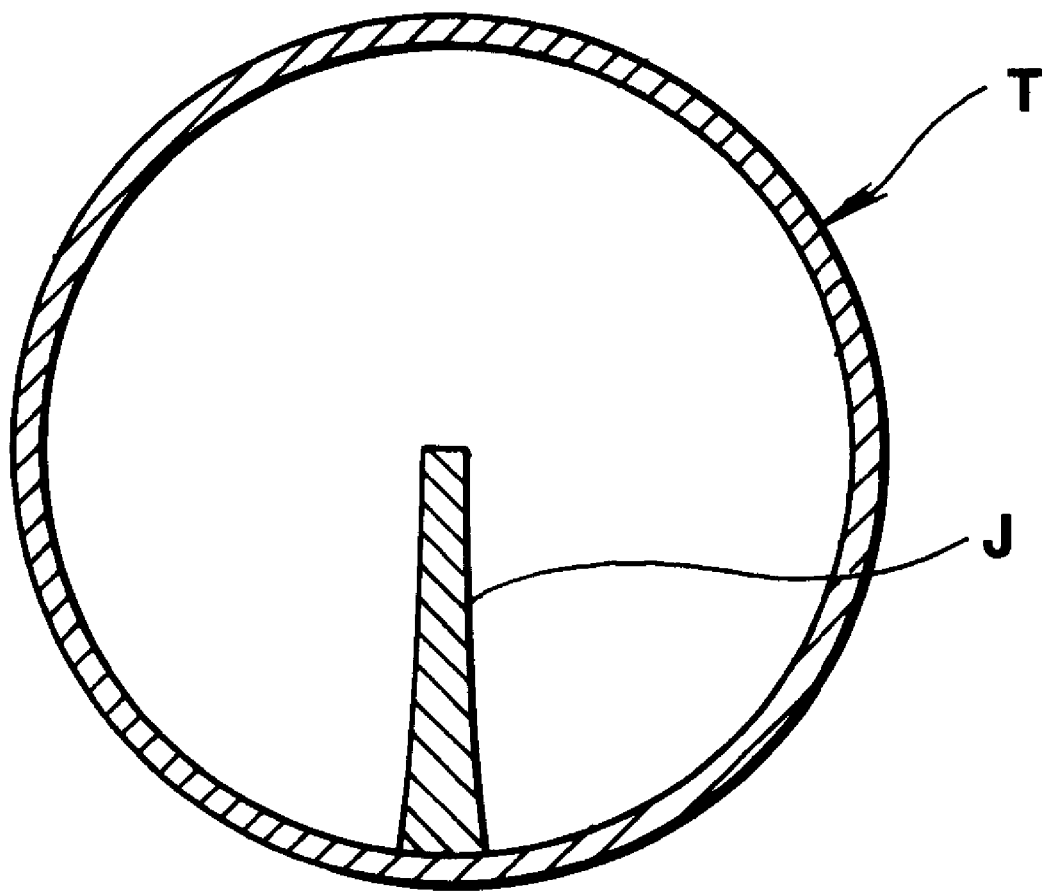
FIG. 3 is a cross sectional view showing an example of shape of discharge hole for producing carbon fiber having notch structure.

In the anode material for non-aqueous electrolyte secondary battery of this invention, as carbon material for carrying out doping/undoping of lithium, there is used carbon fiber in which the area replenishment rate (degree) of the cross section is 0.8 or more, preferably 0.9 or more.

In this case, the area replenishment rate (degree) is defined as value obtained by dividing area of cross section of fiber by product (area) of long side and short side of circumscribed rectangle which takes the minimum area in the case where the cross section of fiber is encompassed by the circumscribed rectangle.

According as the area replenishment rate (degree) becomes closer to 1, the cross sectional shape of fiber becomes closer to rectangle, so the dead space taking place by curved surface is decreased. For this reason, the electrode filling (packing) ability can be enhanced. Accordingly, the energy density of the battery can be improved.

The area replenishment rate (degree) Y can be calculated by observing profile (cross sectional) image of carbon fiber or its photograph by microscope such as electron microscope, etc. to determine area S of projected profile (cross sectional) image, and long side L and short side B in the case where circumscribed rectangle which takes the minimum area is taken with respect to the profile (cross sectional) image to carry out substitution of these values into the following equation (1).

$$\text{Area replenishment rate (degree) } Y = S/(L \times B) \quad (1)$$

In actual calculation, arbitrary 20 sample particles were extracted to carry out similar calculation to allow its average value to be representative value of that material.

By further prescribing material within the above-mentioned range of the area replenishment rate (degree) by circularity, the cycle characteristic can be improved.

The circularity is the value obtained by dividing circumferential length of circle having the same area as the area of projected profile image by length of contour of the profile image. According as the profile image becomes close to circular shape, its value becomes equal to 1. In more practical sense, the circularity can be determined by the following method.

Namely, an approach is employed to observe profile image of carbon fiber or its photograph by microscope such as electron microscope, etc. to determine circumference Lr of circle having the same area as the area S of the protected profile image and contour length Lt of the projected profile image to carry out substitution of these values into the equation (2), thus to calculate circularity C.

$$\text{Circularity } C = Lr/Lt \quad (2)$$

In actual calculation, arbitrary 20 sample particles 20 were similarly extracted to carry out similar calculation thereof to allow its average value to be representative value of that material.

The value of circularity is preferably 0.8 or more and is less than 1.0, and is more preferably 0.9 or more and is less than 1.0. By allowing the value of circularity to fall within this range, the cycle characteristic is improved.

Although its reason is not certain, according as circularity becomes high, there results particle having lower flatness, so the bulk density is increased and the electrode structure becomes satisfactory. For this reason, it is estimated that the cycle life time is elongated.

In producing the carbon fiber, as organic material which is the starting material, there can be used polymer or the like such as polyacrylonitrile or rayon, petroleum system pitch, coal system pitch, synthetic pitch, and pitch or the like such as mesophase pitch, etc., in which these materials are held for an arbitrary time at about 400° C. at the maximum, or they are caused to undergo polymerization promotion by addition of acid, etc., whereby aromatic rings are condensed or are caused to be polycyclic so that they are stacked and oriented.

Particularly, in the case where mesophase pitches are used, the mesophase percentage content greatly affects fiber forming ability, and the physical characteristic, or electric or chemical characteristic of carbon fiber. It is preferable that the mesophase percentage content is 60% or more. It is further preferable that the mesophase percentage content is 95% or more. If the mesophase percentage is less than this range, orientation of crystal is inferior and lowering, etc. of capacity of material itself is caused. Therefore, this is not preferable.

In the case where organic fiber which is precursor of carbon fiber is manufactured (produced), the above-mentioned polymer or the like or the above-mentioned pitch or the like is heated so that it is in molten state. The material in molten state is formed as fiber after undergone molding by discharge, etc. In this case, melting point is diverse in dependency upon respective organic materials. With respect to respective organic materials, optimum fiber forming temperatures can be suitably selected.

The structure of the carbon fiber greatly reflects the structure of organic fiber which is precursor, particularly the cross sectional shape reflects the shape in carrying out fiber forming. For this reason, e.g., in the case of extraction molding, it is important to select optimum shape of discharge hole.

Meanwhile, the structure of carbon fiber functioning as anode material is classified into several structures in dependency upon its cross sectional structure. In more practical sense, there are structures of carbon fibers of onion-skin type oriented in a concentrical form, the radial type radially oriented and the isotropic random type, etc. All carbon fibers can be used as the anode material. Particularly, the radial type, or the random radial type in which the radial type and the random type are mixed is suitable.

The value of fractal dimension of the graphitized carbon fiber cross section having the random radial type structure will now be described.

The fractal dimension of the carbon fiber cross section is index indicating the structure of carbon net plane in the fiber cross section. In order to obtain this fractal dimension, the electron microscope (electric field radiation type scanning electron microscope, etc.), etc. was first used to allow picture image of fiber cross section to be photograph, etc. to take that picture image into the computer by using scanner, etc. to allow it to undergo picture processing thereafter to carry out fractal analysis. The average value determined with respect to ten (10) fibers was caused to be value of fractal dimension (hereinafter simply referred to as "FD value").

The fractal dimension indicates degree of curvature of curve within the plane and takes value of 1 to 2. In this case, according as the curve becomes complicated, value of the fractal dimension becomes close to 2. Namely, it is possible to quantitatively evaluate complicated carbon fiber cross sectional structure by the FD value. Particularly, the FD value is important as parameter for evaluating the curved structure of the carbon net plane which affects capacity as anode and reversibility of charge/discharge cycle.

According as this value becomes close to 2, the curved structure becomes complicated and the fiber strength becomes high. Thus, reversibility of the charge/discharge cycle is improved. However, on one hand, according as the curved structure becomes complicated, graphitization becomes difficult. As a result, crystallinity is not improved and the intercurlation capacity is decreased.

For this reason, in order to allow crystallinity to be high and to allow reversibility of charge/discharge cycle to be satisfactory, it is preferable that the FD value is 1.1 or more and is less than 1.8, and it is more preferable that the FD value is 1.25 or more and is less than 1.8.

Moreover, as parameter of the crystal structure, (002) spacing $d_{002}$ obtained by the X-ray analysis method (method of the Japan Society of Promotion of Scientific Research) becomes index. In this case, it is preferable that $d_{002}$ is less than 0.340 nm, it is more preferable that $d_{002}$ is 0.335 nm or more and is 0.337 nm or less, and it is most preferable that $d_{002}$ is 0.335 nm or more and is 0.336 nm or less.

In order to control the crystallinity and the FD value, the starting material and the method of conversion into fiber are important.

For example, in producing carbon fiber, as organic material which is the starting material, there are used polymer or the like such as polyacrylonitrile or rayon, etc., petroleum system pitch, coal system pitch, synthetic pitch, and pitch or the like such as mesophase pitch, etc. in which these materials are held for an arbitrary time at about 400° C. at the maximum, or they are caused to undergo polymerization promotion by addition of acid, etc., whereby aromatic rings are condensed or are caused to be polycyclic so that they are stacked and oriented.

Particularly, in the case where mesophase pitch is used, mesophase percentage content greatly affects fiber forming and the physical characteristic or electric or chemical characteristic of carbon fiber. It is preferable that the mesophase percentage content is 60% or more, and it is more preferable that the mesophase percentage content is 95% or more. If the mesophase percentage content is less than this range, orientation of crystal is inferior and lowering, etc. of capacity of material itself is caused. Therefore, this is not preferable.

In the case where organic carbon which is carbon fiber precursor is manufactures (produced), the above-mentioned polymer or the like, or pitch or the like is heated so that it is in molten state. The molten material thus obtained is molded by discharge, etc. so that fiber is formed. In this case, melting point is diverse in dependency upon respective organic materials, and optimum fiber forming temperatures can be suitably selected with respect to respective organic materials.

Particularly, since the FD value is greatly affected by the fiber forming condition, i.e., extrusion speed in the case of the extrusion molding and/or shape of discharge hole, etc., it is necessary to reasonably control these parameters. Moreover, in discharging, also by allowing flow of the pitch within the discharge hole to be turbulence, it is possible to form curved structure of carbon net plane in the cross sectional structure. In this case, there may be used a method in which fine holes are provided at the discharge hole to blow off gas such as air, etc., a method in which magnetic field is caused to be produced in the vicinity of discharge hole to disturb pitch orientation, and a method in which discharge hole is vibrated by ultrasonic wave, etc.

The graphitized carbon fiber in which the central portion is of the radial type structure and the surface layer portion is of the random radial structure will now be described.

In the high order structure of the carbon fiber cross section, its central portion is caused to be of the radial type structure and the surface layer portion is caused to be of the random radial type structure, whereby carbon fiber having both the strength tolerable to expansion/contraction at the time of charge/discharge and high capacity can be realized.

Namely, the cross sectional high order structure in this carbon fiber is such that its central portion takes the radial type structure as shown in FIG. 1A. In the case of this radial type structure, orientation of the carbon layer surface is high. Particularly, high crystallinity is easy to be obtained by high temperature heat treatment. On the other hand, since fiber structure breakage by expansion/contraction at the time of charge/discharge becomes apt to take place, the surface layer portion where crack takes place is caused to be of the random radial type structure having high strength and relatively high crystallinity, whereby more practical carbon fiber having high intercurlation capacity and high strength tolerable to expansion/contraction at the time of charge/discharge is provided.

In the above-mentioned carbon fiber, if it includes many radial type structures, the intercurlation capacity is increased, but fiber structure breakage occurring by repetition of expansion/contraction at the time of charge/discharge is apt to take place on the other hand. For this reason, the percentage content of the radial type structures should be suitably selected according to use purpose of the buttery.

In the case where the cross section of the fiber carbon is circular, when the radius from its center is designated at R and the radius of the portion which forms the radial type structure in a concentrical form is designated at L as shown in FIG. 1B, the percentage content of the radial type structures can be prescribed by L/R.

Moreover, with respect to the cross sectional shape except for circular shape, when the geometric center of gravity is caused to be center and an arbitrary line is drawn from its center up to the cross section terminating portion, L/R is determined where its length is designated at R and the length of the portion which forms the radial type structure is designated at L. Further, lines are drawn at 15° intervals with the line being as reference to similarly determine L/R (values) with respect to these respective lines to prescribe the average value thereof as percentage content of the radial type structures.

It is preferable that the value of percentage content of the radial type structures is 0.3 or more and is less than 1.0, it is more preferable that the value of the percentage content is 0.5 or more and is less than 1.0, and it is particularly preferable that the value of percentage content is 0.6 or more and is 0.9 or less.

It is to be noted that the radial type structure designates the portion radially oriented from the center of the fiber cross section, and the portion of this radial type structure can be confirmed by observing it ordinarily by the scanning type electron microscope, etc. Moreover, since the radial type structure is the portion where an isotropy of crystal is high, it is possible to confirm it also by observing very small range by the polarization microscope or the transmission type electron microscope.

The carbon fiber takes at least two kinds of different structures divided in concentrical form in the case of circular shape in its cross sectional structure. In order to make up (manufacture) carbon fiber having such structure, it is necessary to control the structure of pitch, etc. molten (fused) in the vicinity of the discharge hole outlet at the time of manufacturing organic fiber.

As the above-mentioned control method, there may be applied any methods such as a method in which air, etc. is blown out within the discharge hole to change flow of orientation state of pitch, etc., a method in which magnetic field is applied from the external of the discharge hole to change flow of orientation state of pitch, etc., and a method in which the structure of the discharge hole itself is caused to be structure divided into at least two sections or more in a concentrical form to change flow of pitch, etc. to thereby vary the orientation state, etc.

The graphitized carbon fiber having notch structure will now be described.

By allowing the high order structure of the carbon fiber cross section to be of notch structure, carbon fiber having high capacity and strength tolerable to expansion/contraction at the time of charge/discharge can be realized.

Namely, in the cross sectional high order structure in the carbon fiber, a structure such that a portion of carbon fiber shown in FIG. 2 is lacking or missing, i.e., notch structure is provided in advance. Thus, even if the carbon portion is high crystallinity, the structure distortion occurring by expansion/contraction taking place at the time of charge/discharge can be absorbed by its notch portion. As a result, reversibility of the charge/discharge cycle can be improved.

In the above-mentioned notch structure, the cycle reversibility varies by difference of angle that the center and the fiber diameter outer circumference of the carbon fiber cross section shown in FIG. 2B form (hereinafter referred to as "notch angle"). Theoretically, it is known that the interlayer portion is swollen by about 10% by intercurlation to the graphite structure. If the notch angle is small, the structure distortion taking place by expansion/contraction occurring at the time of charge/discharge fails to be absorbed. As a result, the structure breakage takes place. On the other hand, if the notch angle is large, the carbon structure portion is decreased so that the capacity is lowered. For this reason, while it is possible to suitably select the notch angle in dependency upon the purpose, it is preferable that its angle is 2° or more and is 150° or less.

With respect to the cross sectional shape except for circular shape, definition is made such that the geometrical center of gravity is caused to be center and angle that its center and the fiber outer circumference form is caused to be notch angle.

In measurement of the notch angle of the carbon fiber having notch structure at the cross section, the fiber cross section is observed by the electron microscope, thus making it possible to measure angle by picture image or photographic picture image.

In the cross sectional high order structure in the carbon fiber, according as the ratio to take the radial type structure becomes high, higher capacity can be obtained. However, the above-mentioned structure distortion has a tendency to take place. For this reason, there may be suitably selected the cross sectional structure such as the random radial type, etc. in which, e.g., the random type structure except for the radial type structure is mixed in dependency upon the purpose. In this case, since the strength of the carbon fiber itself is increased, the notch structure is provided, thereby permitting reversibility of the charge/discharge cycle to be further satisfactory.

The above-mentioned carbon fiber having the notch structure can be made up (prepared) by using discharge hole T having an outlet shape such that baffle plate is provided so that wedge is inserted in fiber-forming of organic fiber as shown in FIG. 3, for example. However, the outlet shape is not limited to such shape. In addition, if notch structure can be formed at the cross sectional structure of organic fiber which is the precursor, any other methods can be applied.

A method of manufacturing carbon fiber crushed powder having less unevenness of the material value parameter will now be described.

As shown in FIG. 4, graphitized carbon fiber serving as precursor (hereinafter simply referred to as "precursor graphitized fiber") with respect to carbon fiber crushed powder (hereinafter simply referred to as "crushed powder") is caused to be of the structure having cross sectional portions different in the crystal structure at specific or predetermined period (FIG. 4 shows the periodical structure of length 1) in the fiber length direction. This graphitized carbon fiber is crushed to form crushed powder serving as sample powder 22. Since the crystal orientation is different at different crystalline portions 21 different in the crystal structure, the precursor graphitized fiber becomes easy to be broken by this portion at the time of crushing. Thus, sample powder 22 of predetermined fiber length can be easily made up. In this case, the fiber diameter is caused to be d.

The structure of the carbon fiber greatly reflects the structure of the organic fiber serving as the precursor. Accordingly, it is necessary to form the different crystalline portion 215 that the precursor graphitized fiber 20 of this invention has while controlling the crystal orientation when the organic fiber is caused to undergo fiber-forming.

As the method of controlling the crystal orientation at the time point of carrying out fiber-forming of organic fiber, there are method in which, in discharging, flow of pitch within the discharge hole is caused to be turbulence every certain length, a method in which fine holes are provided at the discharge hole to blow out gas such as, etc., and a method in which the discharge hole is vibrated by ultrasonic wave, etc. In addition, the property that pitch or the like serving as material is oriented with respect to magnetic field may be utilized.

Any methods of controlling crystal orientation except for the above may be utilized. The important factor is the ratio that the different crystalline portions 21 are included within the precursor graphitized fiber 20 or the interval (spacing) thereof.

Moreover, the different crystalline portions 21 may be caused to exist in such a manner that they are distributed over the entirety of the cross section of the precursor graphitized fiber 20, or may be caused to partially exist. The existing state of the different crystalline portions 21 can be suitably selected in correspondence with material parameter of required crushed powder. In this case, there are instances where when the percentage content of the different crystalline portions is increased, the intercalation capacity is decreased. It is preferable that the percentage content is smaller.

With respect to orientation of the different crystalline portion 21, since it is necessary to break it in a direction perpendicular to the fiber axis by crushing, etc., it is preferable to orient the different crystalline portion 21 in the state nearly perpendicularly to the fiber cross section. It is preferable that smaller angle that the different crystalline portion 21 forms with respect to the fiber axis is 60° or more, and it is more preferable that such angle is 80° or more.

In the case where the spacing W between the different crystalline portions 21 existing in the precursor graphitized fiber 20 is short, material of small aspect ratio can be obtained. On the other hand, there are instances where the percentage (content) of the different crystalline portions 21 becomes high so that the intercalation capacity is decreased. Further, in the case where this spacing W is long, material of large aspect ratio is provided. However, since the percentage (content) of the different crystalline portions 21 becomes lower, loss of capacity is decreased. For this reason, while this spacing can be suitably selected in correspondence with material parameter or capacity of required crushed powder, it is preferable that the spacing is 1 d or more and is 100 d or less with respect to fiber diameter d.

In making up (preparing) carbon fiber as previously explained, the organic fiber which is the precursor of carbon fiber is caused to be infusible state after fiber-forming and before heat treatment. Although its more practical means is not limited, there may be used, e.g., the wet method by aqueous solution such as nitric acid, mixed acid, sulfuric acid or hypochlorous acid, etc., the dry method by oxidizing gas (air, oxygen), and reaction by solid reagent such as sulfur, ammonium nitride, ammonium persulfate or ferric chloride, etc. In addition, in carrying out the above-mentioned treatment (processing), drawing or stretching operation may be carried out with respect to fiber.

The organic fiber which has been caused to undergo infusible treatment (processing) is heat-treated in inactive gas flow such as nitride, etc. In this case, as the condition, it is preferable to carbonize organic fiber at 300 to 700° C. thereafter to calcine it under the conditions of temperature rising speed of 1 to 100° C. per min., arrival temperature of 900 to 1500° C. and holding time of about 0 to 30 hours at the arrival temperature in the inactive gas flow to carry out heat treatment at 2000° C. or more, preferably at 2500° C. or more in order to obtain further graphitized article. It is a matter of course that carbonization or calcination operation may be omitted depending upon situations. The carbon fiber of this invention graphitized by carrying out heat treatment at high temperature of 2500° C. or more is preferable because it has true density close to artificial graphite and high electrode filling (packing) density.

In this example, carbon fiber produced is applied for anode material after undergone milling or crushing/milling. At this time, crushing may be carried out before and after carbonization or calcination, or in the process of temperature elevation before graphitization. In this case, heat treatment for graphitization is ultimately carried out in powdered state.

In this invention, crushed powder of carbon fiber is used as anode material. In this case, materials of smaller aspect ratio exhibit high performance. Accordingly, it is preferable that the aspect ratio of crushed powder is 50 or less and it is more preferable that the aspect ratio is 10 or less. Moreover, it is preferable that the fiber diameter of the precursor graphitized fiber is more than 5 µm and is 100 µm or less, and it is more preferable that the fiber diameter is 8 µm or more and is 60 µm or less. According as the fiber diameter becomes small, the specific surface area becomes broader. In addition, according as the fiber diameter becomes greater, the effect for rendering fiber shape is lowered to more degree. For this reason, this is not preferable.

In this example, the fiber diameter and the fiber length are determined by observing crushed powder by using the electron microscope, etc. Moreover, value obtained by dividing its fiber length by the fiber diameter is prescribed as the aspect ratio in that crushed powder. This measurement is carried out with respect to ten (10) crushed powder samples to allow respective average values to be fiber diameter, fiber length and aspect ratio A.

Carbon fibers prescribed as described above respectively independently exhibit effects. In this case, by arbitrarily combining these effects, further great effects can be obtained.

For example, in the case where the carbon fiber has high order structure of the random radial type in the high order structure of the carbon fiber cross section, the value of fractal dimension and crystallinity are prescribed, whereby high capacity carbon fiber having less unevenness in the charge/discharge performance and satisfactory in the charge/discharge cycle reversibility can be provided. In this case, in carbon fibers having high order structure in which the central portion is of the radial type structure and the surface layer portion is of the random radial type, value of the fractal dimension and/or crystallinity are prescribed at the portion of the random radial type, whereby the characteristic is further improved.

Moreover, the manufacturing methods in which the area replenishment rate (degree) and/or circularity of cross sectional shape of carbon fiber, and/or cross sectional portions different in the crystal structure at specific or predetermined periods in the fiber length direction can be applied also in carbon fibers of any cross sectional high order structure. By combination of these methods, anode material having high performance at the industrial level can be obtained.

By allowing anode material to satisfy material values explained below, more practical anode material can be obtained.

In order to obtain higher electrode pack (filling) density, it is preferable that the true density of graphitized carbon fiber is 2.1 g/cm$^3$ or more, and it is more preferable that the true density is 2.18 g/cm$^3$ or more. The true density of graphite material (pycnometer by butanol solvent) is determined by its crystallinity, and crystal structure parameters such as (002) spacing and C-axis crystalline element thickness of (002) plane, etc. obtained by the X-ray diffraction method (method of the Japan Society for Promotion of the Scientific Research) are caused to serve as index. In order to obtain material of high true density, it is desirable to have higher crystallinity. It is preferable that (002) spacing obtained by the X-ray diffraction method is less than 0.340 nm, and it is more preferable that the (002) spacing is 0.335 nm or more and is 0.337 nm or less. In addition, with respect to the C-axis crystalline element thickness of (002) plane, it is preferable that the thickness is 30.0 nm or more, and it is more preferable that the thickness is 40.0 nm or more.

Moreover, in order to obtain satisfactory cycle characteristic, it is preferable to use material having bulk density of 0.4 g/cm$^3$ or more. Anode constituted by using graphite material having bulk density of 0.4 g/cm$^3$ or more has satisfactory electrode structure, and is difficult to experience inconveniences such that graphite material slips off from anode mix layer. Accordingly, long cycle life time can be obtained.

In this example, the bulk density prescribed here is value determined by the method described in JIS K-1469. If graphite material having bulk density of 0.4 g/cm$^3$ or more is used, sufficiently long cycle life time can be obtained. It is preferable to use material having bulk density of 0.8 g/cm$^3$ or more. It is more preferable to use material having bulk density of 0.9 g/cm$^3$ or more.

Bulk Density Measurement Method

The measurement method of bulk density will be indicated as below.

Measuring cylinder of volume of 100 cm$^3$ of which mass has been measured in advance is inclined to gradually throw sample powder of 100 cm$^3$ thereinto. Then, mass of the entirety is measured by the minimum scale 0.1 g to subtract the mass of the measuring cylinder from its mass to thereby determine mass of the sample powder.

Then, cork stopper is put on the measuring cylinder in which the sample powder is thrown to fall the measuring cylinder in that state 50 times from height of about 5 cm with respect to rubber plate. Since the sample powder within the measuring cylinder is compressed as the result of falling, volume V of the compressed sample powder is read. Thus, bulk density (g/cm$^3$) is calculated from the following equation (3).

$$D=W/V \quad (3)$$

where

D is bulk density (g/cm$^3$),

W is mass (g) of sample powder within the measuring cylinder, and

V is volume (cm$^3$) of sample powder within the measuring cylinder after 50 falling times.

Figure 5A:
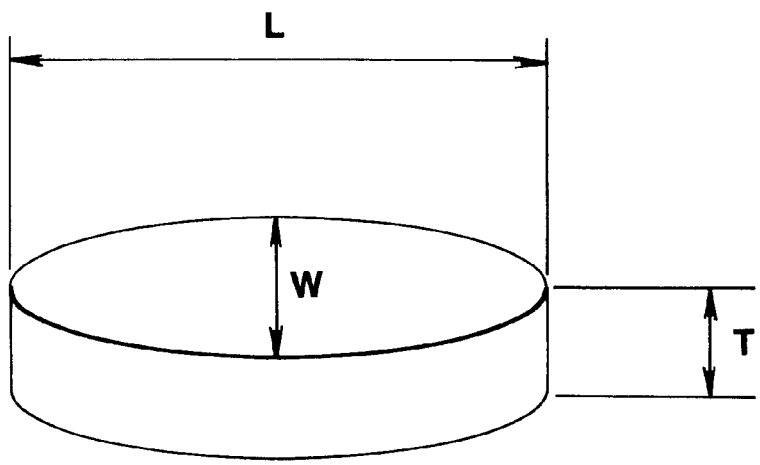
FIG. 5 is a perspective view showing, in a model form, carbon fiber particle model.
Figure 5B:
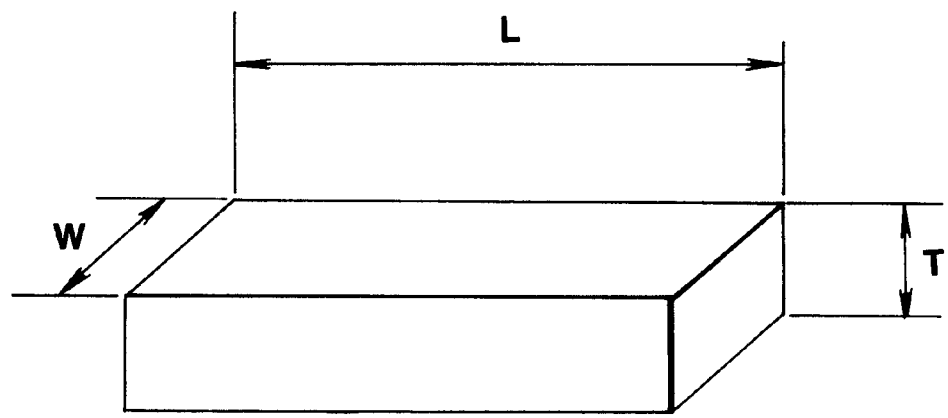

Further, in the case where the average value of shape parameters x indicated by the following equation (4) is 125 or less, the cycle characteristic further becomes satisfactory. Namely, the representative shape of graphite material powder is flat columnar shape as shown in FIG. 5a, or parallelepiped shape as shown in FIG. 5b. When the thickness of the thinnest portion of this graphite material powder is designated at T and the length of the longest portion thereof is designated at L, and the length in the direction perpendicular to the long axis corresponding to depth is designated at W, product of values obtained by respectively dividing L and W by T is the above-mentioned shape parameter x. This shape parameter x means that according as its value becomes smaller, height with respect to the bottom area becomes higher and degree of flatness becomes smaller.

$$x=(W/T)\times(L/T) \quad (4)$$

where x is shape parameter,

T is thickness of the thinnest portion of powder,

L is length in the long axis direction of powder, and

W is length in the direction perpendicular to long axis of powder.

The average shape parameter $x_{ave}$ mentioned here refers to value determined by actual measurement as described below. Initially, graphite sample powder is observed by using SEM (Scanning type Electron Microscope) to select ten (10) powder samples such that the length of the longest portion is ±30% of the average particle diameter. Then, shape parameters x are calculated from the equation (4) with respect to respective selected ten (10) powder samples to calculate the average value. The average value thus calculated is the average shape parameter $x_{ave}$.

If the average shape parameter $x_{ave}$ of graphite powder is 125 or less, the above-mentioned effect can be obtained. It is preferable that the value of the average shape parameter $x_{ave}$ is 2 or more and is less than 115, and it is more preferable that the value of the average shape parameter $x_{ave}$ is 2 or more and is 100 or less.

Moreover, in the case where material having specific surface area of 9 m$^2$/g or less is used, longer cycle life time can be obtained.

This is because it is considered that micro particles of sub micron attached to graphite particles affect lowering of bulk density. Since the specific surface area is increased in the case where micro particles are attached, employment of graphite powder of small specific surface area even in the case of similar grain size results in less influence by micro particle. Thus, high bulk density can be obtained. As a result, the cycle characteristic is improved.

It is to be noted that the specific surface area mentioned here is specific surface area measured and determined by the BET method. Although if the specific surface area of graphite powder is 9 m$^2$/g or less, the above-mentioned effect can be sufficiently obtained, its value is preferably 7 m$^2$/g or less and its value is more preferably 5 m$^2$/g or less.

Moreover, in order to obtain high safety and reliability as practical buttery, it is desirable to use graphite powder in which, in the grain size distribution determined by the laser diffraction method, the accumulated 10% particle diameter is 3 μm or more, the accumulated 50% particle diameter is 10 μm or more, and the accumulated 90% particle diameter is 70 μm or less.

Graphite powder filled (packed) into the electrode can be filled (packed) more efficiently when the grain size distribution is caused to have width. A distribution closer to the normal distribution is preferable. It is to be noted that there are instances where the battery may be heated in abnormal state such as excessive charging, etc., and the heat temperature has a tendency to rise in the case where particles having small diameter are distributed to much degree. Such a grain size distribution is not preferable.

Moreover, since graphite interlayer helium ions are inserted in charging the battery, crystalline elements are swollen by about 10% to press the cathode and/or the separator within the battery, resulting in the state where initial failure such as internal short, etc. is apt to take place at the time of initial charging. In the case where particles of large particle diameter are distributed to much degree, occurrence rate of failure has a tendency to increase. For this reason, this is not preferable.

Accordingly, there is used graphite powder having grain size distribution where particles of large particle diameter to particles of small particle diameter are blended in a well balanced manner. Thus, practical battery having high reliability can be provided. In the case where shape of the grain size distribution is closer to the normal distribution, particles can be filled more efficiently. In this case, it is desirable to use graphite powder in which, in the grain size distribution determined by the laser diffraction method, the accumulated 10% particle diameter is 3 μm or more, the accumulated 50% particle diameter is 10 μm, and the accumulated 90% particle diameter is 70 μm or less. Particularly, in the case where the accumulated 90% particle diameter is 60 μm or less, initial failure can be reduced to much degree.

Further, in order to improve the heavy load characteristic as the practical battery, it is desirable that average value of the breakage strength values of graphite particles is 6.0 kgf/mm$^2$ or more.

Easiness of movement of ions at the time of discharge affects the load characteristic. Particularly, in the case where a large number of holes (vacancies) exist in the electrode, since a sufficient quantity of electrolytic solution exists, satisfactory characteristic is exhibited. On the other hand, in graphite material having crystallinity, graphite hexagonal net planes are developed in the a-axis direction, and crystal of the c-axis is constituted by stacking thereof. Since coupling between carbon hexagonal net planes is coupling called van der Waals force, they are apt to be deformed with respect to stress. For this reason, in compression-molding particles of graphite powder to fill them into the electrode, they are easy to be collapsed or crushed as compared to carbonaceous material baked at low temperation. Thus, it is difficult to ensure holes (vacancies). Accordingly, according as the breakage strength of graphite powder particles becomes higher, they are difficult to be collapsed and holes (vacancies) are easy to be produced. For this reason, the load characteristic can be improved.

It is to be noted that the average value of breakage strength values of graphite particles mentioned here referrers to value determined by actual measurement as described below.

As measurement device for breakage strength, Shimazu Micro Compression Tester (MCTM-500) by Shimazu Seisaku Sho is used. Initially, graphite sample powder is observed by the optical microscope associated therewith to select ten (10) powder samples such that the length of the longest portion is ±10% of average particle diameter. Then, load is applied to the selected respective ten (10) powder samples to measure breakage strength of particles to calculate its average value. The average value thus calculated is the average value of breakage strength values of graphite particles. In order to obtain satisfactory load characteristic, it is preferable that average value of breakage strength values of graphite particles is 6 kgf/mm$^2$ or more.

On the other hand, although cathode material used in combination with such anode consisting of carbon fiber or graphitized carbon fiber is not particularly limited, it is preferable that the cathode material includes sufficient quantity of Li. For example, compound metal oxide consisting of lithium and transition metal, or interlayer compound including Li, etc. represented by the general expression LiMO$_2$ (M indicates at least one of Co, Ni, Mn, Fe, Al, V, Ti) is suitable.

Particularly, since this invention aims at attaining high capacity, the cathode is required to include Li corresponding to charge/discharge capacity of 250 mAh or more per anode carbon material 1g in the steady state (after, e.g., five charge/discharge operations are repeated). It is more preferable to include Li corresponding to charge/discharge capacity of 300 mAh or more.

It is to be noted that it is not necessarily required that Li ions are all delivered from the cathode material, but it is essentially required that there exists Li (ion) corresponding to charge/discharge capacity of 250 mAh or more per carbon material 1g within the battery. In addition, quantity of Li (ions) is assumed to be judged by measuring discharge capacity of the battery.

The anode material is used in the non-aqueous electrolyte secondary battery. In this non-aqueous electrolyte solution secondary battery, non-aqueous electrolytic solution in which electrolyte is dissolved in non-aqueous solvent is used as electrolytic solution.

In this example, since graphite material is used as the anode in this invention, conventional propylene carbonate (PC) cannot be used as main solvent of non-aqueous solvent, and it is therefore the premise that solvents except for the above are used.

As solvent suitable as the main solvent, ethylene carbonate (EC) is first mentioned, but there is also suitable compound of the structure in which hydrogen element of EC is replaced by halogen element.

Moreover, although reactive with graphite material as in the case of PC, a portion of EC as main solvent or compound of the structure in which hydrogen atom of EC is replaced by halogen element is replaced by a very small quantity of second component solvent, whereby satisfactory characteristic can be obtained. As the second component solvent, there can be used PC, butylene carbonate, 1,2-dimethoxyethane, 1,2-diethoxymethane, γ-butyrolactone, valerolactone, tetrahydrofuran, 2-methyltetrahydrofuran, 1,3-dioxolan, 4-methyl-1,3-dioxolan, sulforan, methyl sulforan, etc. It is preferable that the second component solvent is less than 10% by volume as its quantity of addition.

Further, the third component solvent may be added with respect to main solvent, or with respect to mixed solvent of the main solvent and the second component solvent to realize improvement in conductivity, decomposition suppression of EC and improvement in low temperature characteristic, and to allow degree of reaction with lithium metal to be low, thus to improve safety.

As the first mentioned solvent of the third component, chain carbonic ester such as DEC (diethyl carbonate) or DMC (dimethyl carbonate), etc. is suitable. Moreover, unsymmetrical (asymmetrical) chain carbonic ester such as MEC (methyl ethyl carbonate) or MPC (methyl propyl carbonate), etc. is suitable. The mixing ratio of chain carbonic ester which serves as the third component with respect to main solvent or mixed solvent of main solvent and the second component solvent (main solvent or mixed solvent of main solvent and second component solvent: third component solvent) is preferably caused to fall within the range from 10:90 to 60:40, and is more preferably caused to fall within the range from 15:85 to 40:60.

As the solvent of the third component, mixed solvent of MEC and DMC may be employed. It is preferable that the MEC-DMC mixing ratio is caused to fall within the range indicated by $1/9 \leq d/m \leq 8/2$ when MEC volume is designated at m and DMC volume is designated at d. Moreover, it is preferable that the mixing ratio between main solvent or mixed solvent of the main solvent and the second component solvent and MEC-DMC which serves as solvent of the third component is caused to fall within the range indicated by $3/10 \leq (m+d)/T \leq 7/10$ when MEC volume is designated at m, DMC volume is designated at d and the entire volume of the solvent is designated at T.

On the other hand, as electrolyte dissolved into the non-aqueous solvent, any one or more kinds of solvents which can be used in the battery of this kind may be used in the mixed state as occasion demands. For example, LiPF$_6$ is preferable. In addition to the above, however, LiClO$_4$, LiAsF$_6$, LiBF$_4$, LiB(C$_6$H$_5$)$_4$, CH$_3$SO$_3$Li, CF$_3$SO$_3$Li, LiN(CF$_3$SO$_2$)$_2$, LiC(CF$_3$SO$_2$), LiCl, LiBr, etc.

More practical embodiments to which this invention is applied will now be described in detail on the basis of the experimental results.

Initially, studies have been made in connection with the area replenishment rate (degree) and circularity of carbon fiber used as anode material.

Embodiment 1
(a) Manufacture of Anode Material

Coal system pitch was held for five (5) hours at 425° C. in the atmosphere of inactive gas to obtain coal system mesophase pitch of softening point of 220° C. At this time, the mesophase percentage content was 92%.

The coal system mesophase pitch thus obtained was caused to undergo discharging and fiber-forming at a predetermined extraction pressure at 300° C. to obtain precursor fiber. Thereafter, this precursor fiber was caused to experience infusible processing at 260° C. to calcine the precursor fiber thus processed at temperature of 1000° C. in the atmosphere of inactive gas to obtain carbon fiber. Further, this carbon fiber is heat-treated at temperature of 3000° C. in the atmosphere of inactive gas to allow it to undergo air (wind) crushing to obtain sample powder of graphitized carbon fiber.

The cross sectional shape of the sample powder thus obtained was observed by the electron microscopic observation to determine shape and dimensions of the fiber. Moreover, the area replenishment rate (degree) and the circularity were calculated. In this example, in calculation, it was assumed that arbitrary twenty (20) sample particles are extracted to use its average value. The result is shown in Table 1.

The bulk density was determined by the method described in JIS K-1469. Similarly, its result is shown in the Table 1.

Figure 7:
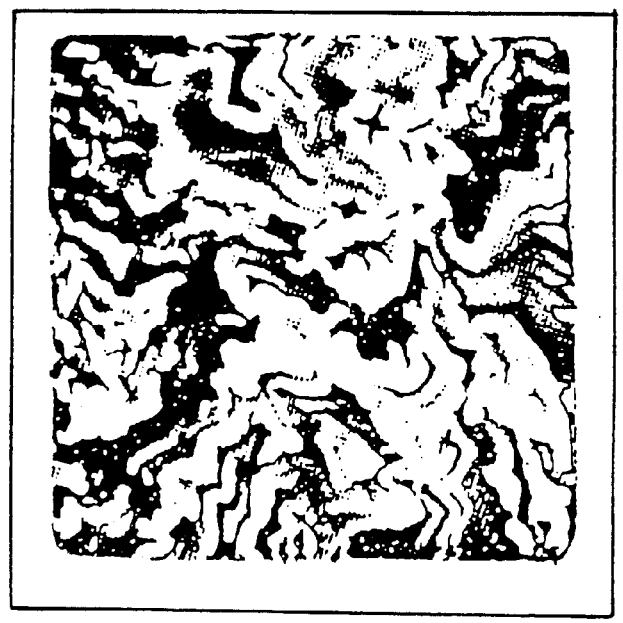
FIG. 7 is a view showing an example of cross sectional shape of graphitized carbon fiber.

In addition, the cross sectional shape of the carbon fiber thus obtained is shown in FIG. 7.

(b) Making Up of Cathode Active Material

Lithium carbonate of 0.5 mol and cobalt carbonate of 1 mol were mixed to bake this mixture for five (5) hours at temperature of 900° C. in air to thereby obtain $LiCoO_2$. As the result of the fact that the X-ray diffraction measurement was conducted with respect to the material thus obtained, its peak was well in correspondence with peak of $LiCoO_2$ registered in JCPDS file.

Figure 6:
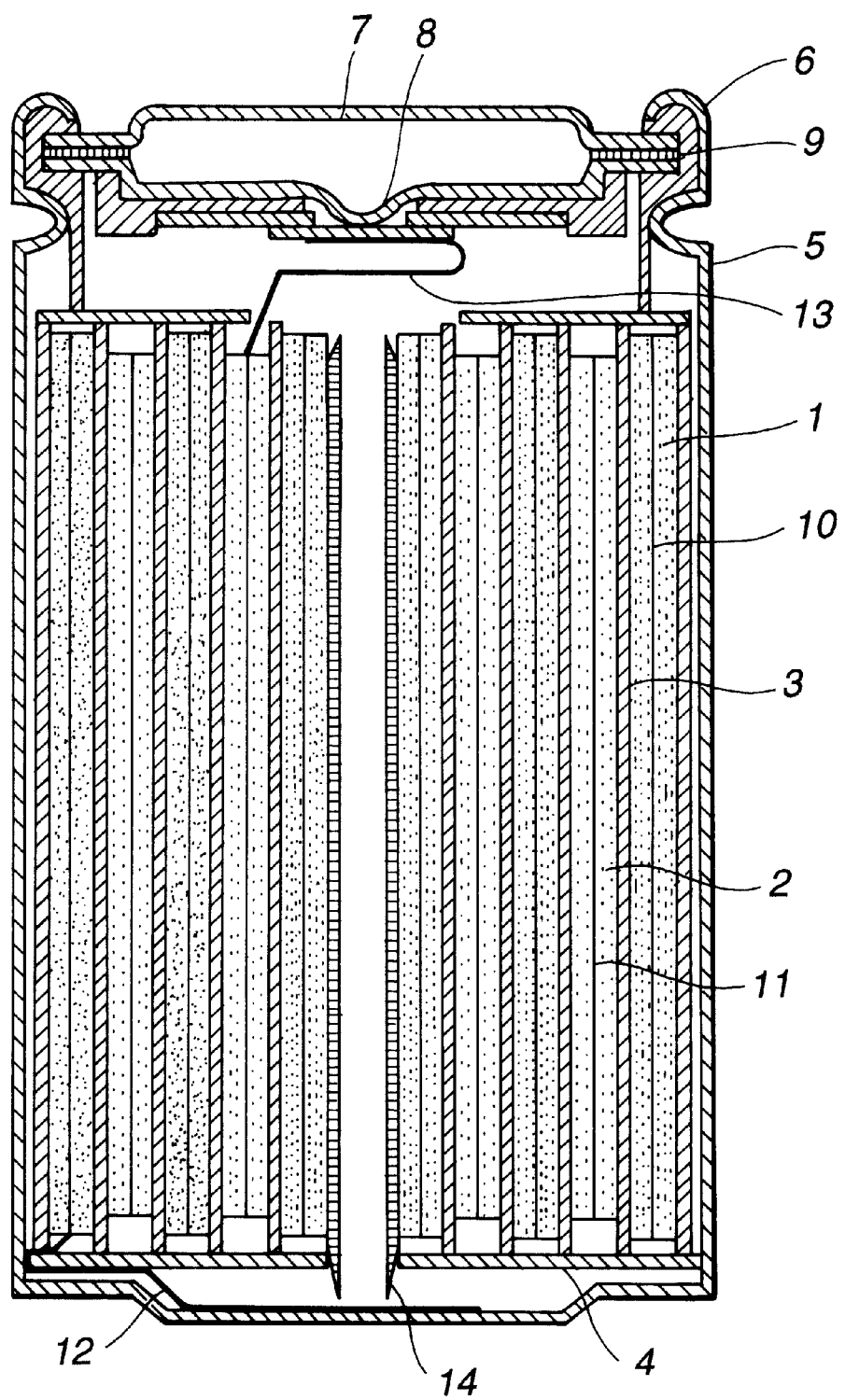
FIG. 6 is a cross sectional view showing an example of structure of non-aqueous electrolyte secondary battery.

Then, the sample powder was used as anode material to actually make up non-aqueous electrolyte secondary battery of the cylindrical type. The configuration of the battery is shown in FIG. 6.

(c) Making Up of the Anode 1

Graphitized carbon fiber powder 90 weight part and polyvinylidene fluoride (PVDF) 10 weight part as binding agent were mixed to prepared anode mix to disperse it into N-methyl pyrolidone serving as solvent to prepare anode mix slurry (in paste state).

Belt-shaped copper foil of thickness of 10 μm was used as an anode collector 10 to coat the anode mix slurry on both surfaces of the collector to dry it thereafter to compression-mold it at predetermined pressure to make up belt-shaped anode 1.

(d) Making Up of Cathode 2

The $LiCoO_2$ thus obtained was crushed so that $LiCoO_2$ powder such that accumulated 50% particle diameter obtained by the laser diffraction method is 15 μm is provided. Then, this $LiCoO_2$ powder 95 weight part and lithium carbonate powder 5 weight part were mixed to mix 91 weight part of this mixture, graphite 6 weight part as conductive agent and polyvinyledene fluoride 3 weight part as binding agent to prepare cathode mix to disperse it into N-methyl pyrolidone to prepare cathode mix slurry (in paste state).

Belt-shaped aluminum foil of thickness of 20 μm was used as a cathode collector 11 to uniformly coat the cathode mix slurry on both surfaces of this collector to dry it thereafter to compression-mold it, thus to make up belt-shaped cathode 2.

(e) Assembling of the Battery

The belt-shaped anode 1 and the belt-shaped cathode 2 which have been made up in a manner as described above are stacked in order of the anode 1, separator 3, the cathode 2, separator 3 through separator consisting of micro porous polypropylene film having thickness of 25 μm thereafter to wound it large number of times, thus to make up spiral type electrode body having outside (outer) diameter of 18 mm.

The spiral type electrode body thus made up is accommodated within a steel battery can 5 to which nickel plating has been implemented. Then, insulating plates 4 are disposed at upper and lower both surfaces of the spiral type electrode to draw a cathode lead 13 of aluminum from anode collector 11 so that it is caused to be conductive with a battery cover 7 to draw an anode lead 12 of nickel from an anode collector 10 to weld it at the battery can 5.

Within this battery can 5, electrolytic solution in which $LiPF_6$ is dissolved at a ratio of 1 mol/l is poured into equi-volmetric mixture solvent of EC and DMC. Then, the battery can 5 is caulked through a sealing gasket 6 of which surface is coated by asphalt to fix a safety valve unit 8 having current interrupting mechanism, a PTC element 9 and the battery cover 7 to keep air-tightness within the battery thus to make up cylindrical non-aqueous electrolyte secondary battery having diameter of 18 mm and height of 65 mm.

Embodiment 2

Graphitized carbon fiber was manufactured similarly to the embodiment 1 except that there is used precursor fiber obtained by holding coal system pitch for two (2) hours at 425° C. in the atmosphere of inactive gas to hold it for two (2) hours at 400° C. under methane gas flow thereafter to further hold it for twenty four (24) hours at 350° C. in the atmosphere of inactive gas to allow the heat-treated coal system mesophase pitch (mesophase percentage content is 95%) to undergo discharge and fiber-forming, and to further make up non-aqueous electrolyte secondary battery.

Also in this example, the fiber shape and the average dimension are determined in a manner similar to the embodiment 1 with respect to powder of the graphitized carbon fiber thus obtained to calculate the area replenishment rate (degree) and the circularity, and to measure bulk density.

Figure 8:
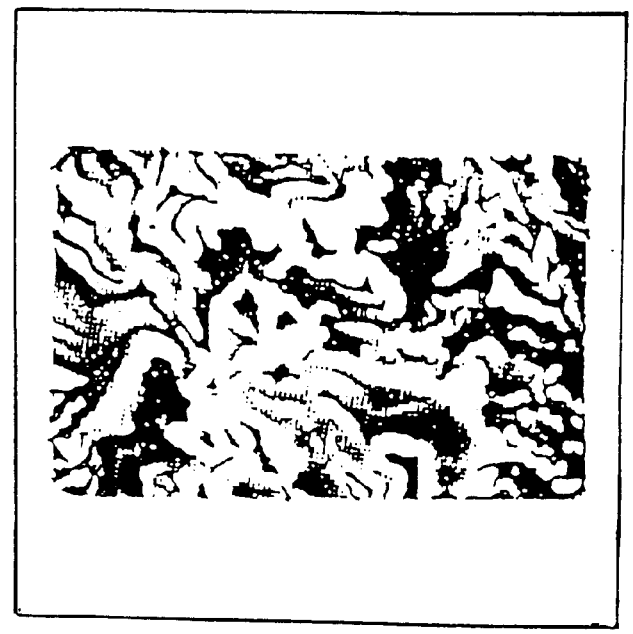
FIG. 8 is a view showing another example of cross sectional shape of the graphitized carbon fiber.

The result is shown in the Table 1. In addition, the fiber cross sectional shape is shown in FIG. 8.

Embodiment 3

Graphitized carbon fiber was manufactured in a manner similar to the embodiment 1 except that there is used precursor fiber obtained by holding petroleum system pitch for three (3) hours at 430° C. in the atmosphere of inactive gas to allow heat-treated petroleum system mesophase pitch having softening point of 210° C. to undergo discharge and fiber-forming, and to make up non-aqueous electrolyte secondary battery.

Also in this example, the fiber shape and the average dimension were determined in a manner similar to the embodiment 1 with respect to powder of the graphitized carbon fiber thus obtained to calculate the area replenishment rate (degree) and circularity, and to measure bulk density.

Figure 9:
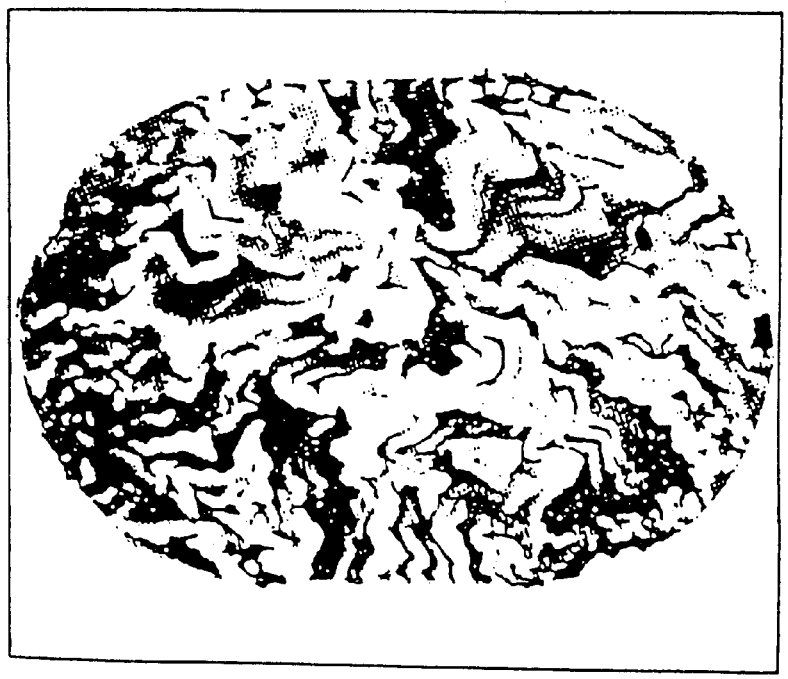
FIG. 9 is a view showing a further example of cross sectional shape of the graphitized carbon fiber.

The result is shown in the Table 1. In addition, the fiber cross sectional shape is shown in FIG. 9.

Embodiment 4

Precursor fiber was made up in a manner similar to the embodiment 3 except that fiber-formable discharge hole which is more flat than that of the embodiment 3 is used thereafter to manufacture graphitized carbon fiber in a manner similar to the embodiment 1, and to make up non-aqueous electrolyte secondary battery.

Also in this example, the fiber shape and the average dimension were determined in a manner similar to the embodiment 1 with respect to powder of the graphitized carbon fiber thus obtained to calculate the area replenishment rate (degree) and circularity, and to measure bulk density.

Figure 10:
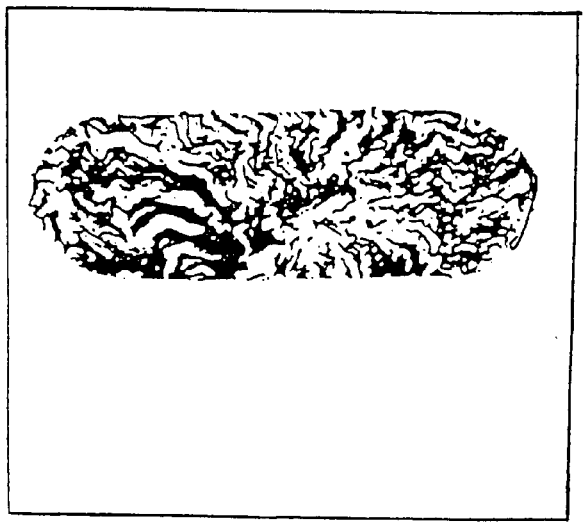
FIG. 10 is a view showing a more further example of cross sectional shape of the graphitized carbon fiber.

The result is shown in Table 1. In addition, the fiber cross sectional shape is shown in FIG. 10.

Comparative Example 1

Precursor fiber was made up in a manner similar to the embodiment 1 except that there is used fiber-formable discharge hole so that the fiber cross section takes right triangle thereafter to manufacture graphitized carbon fiber in a manner similar to the embodiment 1, and to make up non-aqueous electrolyte secondary battery.

Also in this example, the fiber shape and the average dimension were determined in a manner similar to the embodiment 1 with respect to powder of the graphitized carbon fiber thus obtained to calculate area replenishment rate (degree) and circularity, and to measure bulk density.

Figure 11:
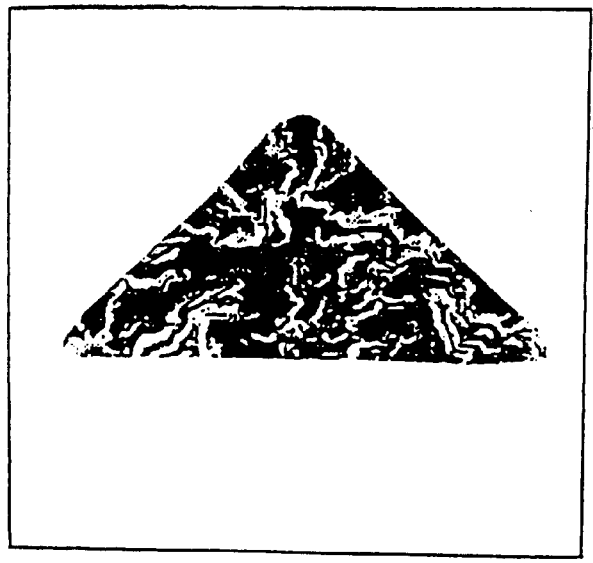
FIG. 11 is a view showing a still more further example of cross sectional shape of the graphitized carbon fiber.

The result is shown in the Table 1. In addition, the fiber cross sectional shape is shown in FIG. 11.

Comparative Example 2

Precursor fiber was made up in a manner similar to the embodiment except that there is used fiber-formable discharge hole so that the fiber cross section takes right triangle thereafter to manufacture graphitized carbon fiber in a manner similar to the embodiment 1, and to make up non-aqueous electrolyte secondary battery.

Also in this example, the fiber shape and the average dimension were determined in a manner similar to the embodiment 1 with respect to powder of the graphitized carbon fiber thus obtained to calculate area replenishment rate (degree) and circularity, and to measure bulk density.

Figure 12:
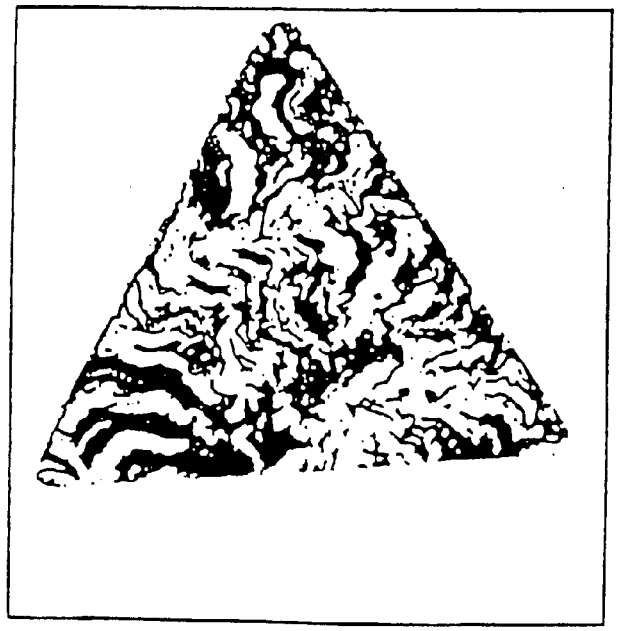
FIG. 12 is a view showing a further different example of cross sectional shape of the graphitized carbon fiber.

The result is shown in the Table 1. In addition, the fiber cross sectional shape is shown in FIG. 12.

Comparative Example 3

Precursor fiber was made up in a manner similar to the embodiment 1 except that there is used fiber-formable discharge hole so that the fiber cross section takes complete round shape thereafter to manufacture graphitized carbon fiber in a manner similar to the embodiment 1, and to make up non-aqueous electrolyte secondary battery.

Also in this example, the fiber shape and the average dimension were determined in a manner similar to the embodiment 1 with respect to powder of the graphitized carbon fiber thus obtained to calculate area replenishment rate (degree) and circularity, and to measure bulk density.

Figure 13:
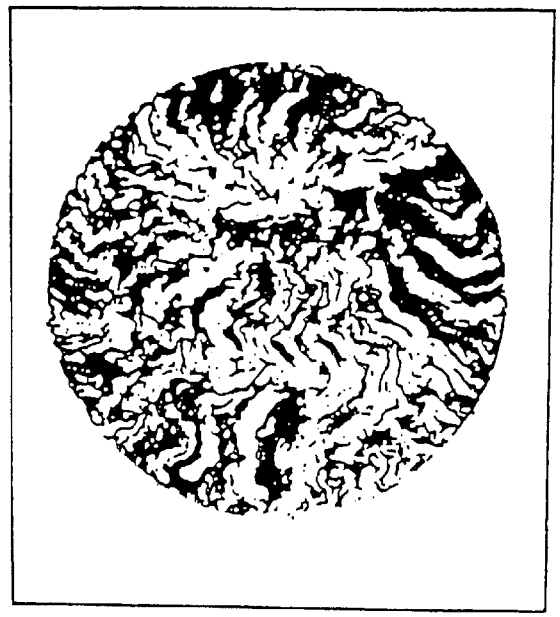
FIG. 13 is a view showing a still further different example of cross sectional shape of graphitized carbon fiber.
Figure 14:
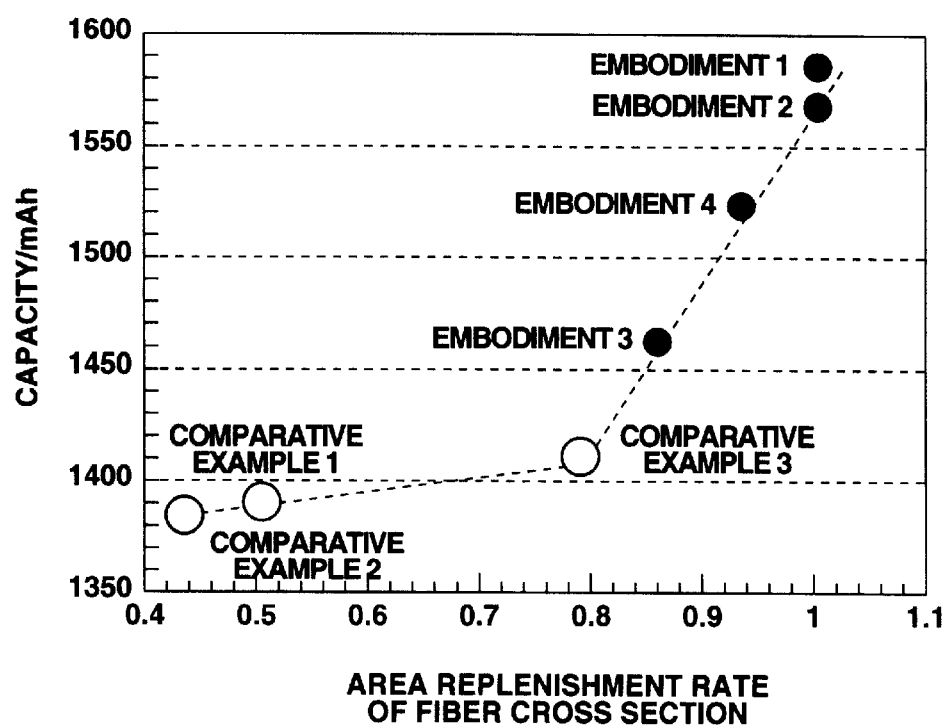
FIG. 14 is a characteristic view showing the relationship between area replenishment rate (degree) of fiber cross section and capacity.

The result is shown in the Table 1. In addition, the fiber cross sectional shape is shown in FIG. 13.

current of 1 A and the maximum charge voltage of 4.2 V thereafter to carry out discharge operation under the condition of discharge current 700 mA until voltage falls down to 2.75 V to measure the battery initial capacity. Its result is shown in Table 2. In addition, the relationship between the area replenishment rate (degree) and the battery initial capacity is shown in FIG. 14.

Figure 15:
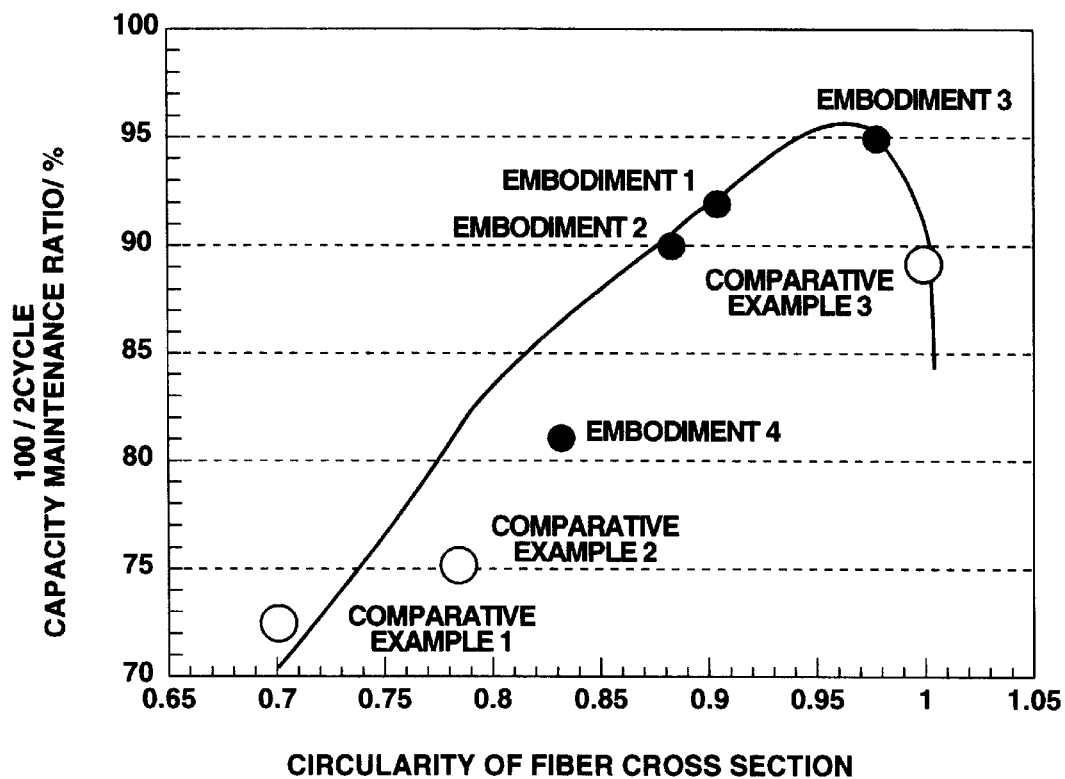
FIG. 15 is a characteristic view showing the relationship between circularity of fiber cross section and capacity maintenance ratio.

Then, the charge/discharge cycle was repeatedly carried out to determine ratio of capacity (capacity maintenance ratio) of the 100-th cycle with respect to capacity of the second cycle (capacity maintenance ratio). In the cycle test, charge operation was conducted for 2.5 hours under the condition of the maximum charge voltage of 4.2 V and the charge current of 1 A, and discharge operation was conducted under the condition of constant current of 700 mA until voltage falls down to 2.75 V. The capacity maintenance ratio was shown together in the Table 2. In addition, the relationship between circularity and capacity maintenance ratio is shown in FIG. 15.

TABLE 2

|  | BATTERY CAPACITY mAh | CAPACITY MAINTENANCE RATIO % |
|---|---|---|
| EMBODIMENT 1 | 1589 | 92 |
| EMBODIMENT 2 | 1572 | 90 |
| EMBODIMENT 3 | 1463 | 95 |
| EMBODIMENT 4 | 1526 | 81 |
| COMPARATIVE EXAMPLE 1 | 1392 | 72 |
| COMPARATIVE EXAMPLE 2 | 1384 | 75 |
| COMPARATIVE EXAMPLE 3 | 1415 | 89 |

As is clear from the Table 2 and FIG. 14, the carbon fibers of the embodiments 1 to 4 having the area replenishment rate (degree) which features this invention exhibited high electrode filling ability and high capacity.

Moreover, as is clear from the Table 2 and FIG. 15, the carbon fiber having a predetermined circularity which is the preferred embodiment also exhibited high bulk density and high cycle capacity maintenance ratio.

TABLE 1

|  | SHAPE | CROSS SECTIONAL DIMENSION μm LONG DIAMETER × SHORT DIAMETER | FIBER LENGTH μm | AREA REPLENISHMENT RATE | CIRCULARITY | BULK DENSITY g/cm$^3$ |
|---|---|---|---|---|---|---|
| EMBODIMENT 1 | SQUARE | 30 × 30 | 70 | 1.00 | 0.89 | 0.92 |
| EMBODIMENT 2 | RECTANGULAR | 30 × 20 | 70 | 1.00 | 0.87 | 0.85 |
| EMBODIMENT 3 | ELLIPTIC | 45 × 15 | 70 | 0.86 | 0.97 | 1.10 |
| EMBODIMENT 4 | ELLIPTIC | 30 × 10 | 70 | 0.93 | 0.82 | 0.60 |
| COMPARATIVE EXAMPLE 1 | RIGHT TRIANGULAR | 30 × 15 | 70 | 0.50 | 0.70 | 0.50 |
| COMPARATIVE EXAMPLE 2 | EQUILATERAL TRIANGULAR | 30 × 26 | 70 | 0.43 | 0.78 | 0.57 |
| COMPARATIVE EXAMPLE 3 | (COMPLETE ROUND) CIRCULAR | 30 × 30 (φ30) | 70 | 0.79 | 1.00 | 0.95 |

(Evaluation)

With respect to the respective batteries of the embodiments and the comparative examples made up as described above, 2.5 hour constant current/constant voltage charge operation was first carried out under the condition of charge It has been found that the non-aqueous electrolyte secondary battery using carbon fiber having a predetermined area replenishment rate (degree) and circularity has the excellent practical characteristic that high energy density and long cycle life time are caused to be compatible.

Studies were then conducted in connection with difference of the characteristic by fractal dimension value of the cross section.

Embodiment 5

Anode material was produced in a manner as described below.

Coal system pitch was held for five (5) hours at 425° C. in the atmosphere of inactive gas to obtain coal system mesophase pitch having softening point of 220° C. At this time, mesophase percentage content was 90%. The coal system mesophase pitch thus obtained was extruded in a pulse form, while applying ultrasonic wave thereto, by using discharge hole having inside diameter of 20 μm at 305° C. to allow it to undergo discharge and fiber-forming while changing pressure. Thus, precursor fiber was obtained. Thereafter, infusible processing was conducted at 260° C. to calcine it at temperature of 1000° C. in the atmosphere of inactive gas. Thus, carbon fiber was obtained. Further, the carbon fiber was heat-treated at temperature of 3000° C. in the atmosphere of inactive gas to allow the carbon fiber thus processed to undergo air crushing/milling. Thus, sample powder of graphitized carbon fiber was obtained.

As the result of the fact that (002) spacing $d_{002}$ and FD value of the sample powder thus obtained are determined, $d_{002}$ was equal to 0.3363 nm, and FD was equal to 1.1.

The method of measuring the fractal dimension (FD) value will now be described.

Figure 16A:
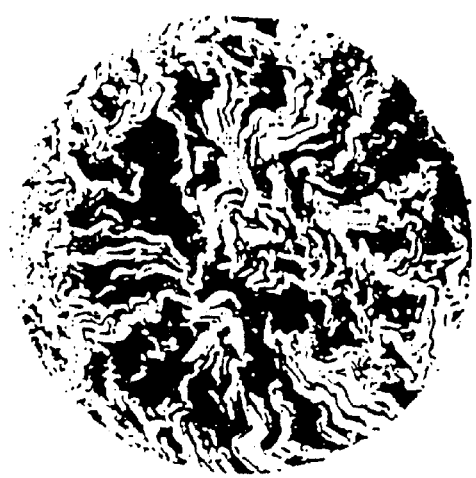
FIG. 16 is a view showing an example of measurement of fractal dimension.
Figure 16B:
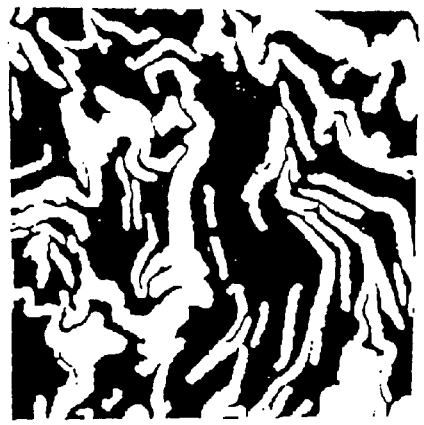
Figure 16C:

Initially, in order to obtain picture image of the carbon fiber cross sectional structure, the cross section was observed under the acceleration voltage condition of 2 kv by using the electric field radiation type scanning electron microscope to take this still picture into the computer to divide the picture image thus obtained (FIG. 16A) into different five portions including the fiber central portions of 4 μm×4 μm (consisting of pixels of 512×512) as shown in FIG. 16B. In the case where luminance of picture image is not uniform, Fourie transform or filtering processing is implemented to carry out smoothing thereafter to binarize respective picture images. In the case where there is necessity to more clarify the curve shape of the carbon network plane, image processing is implemented so that the white portion of the binarized picture image can be recognized as thin line (FIG. 16C).

Calculation was carried out by using the equation (5) with respect to the above-described five picture images to determine fractal dimension d.

$$d = -\Delta \log N(1)/\Delta \log 1 \quad (5)$$

where
- 1 is total number of squares when picture image is divided into squares of certain size, and
- N is the number of squares overlapping with curve of carbon net plane when picture image is divided into squares of certain size.

Namely, picture image is divided into lattices consisting of squares to calculate the number of squares overlapping with the curve of the carbon net plane to similarly carry out calculation while changing the size of square to determine average value with respect to five picture images. Further, such measurement was carried out with respect to ten (10) fibers to determine average value to allow it to be FD value.

The fractal dimension (FD) value can be measured also by the method described in, e.g., Carbon Material Society Bulletin "Carbon TANSO 1995, No. 169, P.207 to 214".

The above-mentioned sample powder was used as the anode material to make up cylindrical non-aqueous electrolyte secondary battery. The method of making up (preparing) cathode active material, the method of making up (preparing) electrode and the method of assembling the battery are similar to those of the previously described embodiment 1.

Embodiment 6

Cylindrical non-aqueous electrolyte secondary battery was made up in a manner similar to the embodiment 5 except that discharge/fiber-forming was carried out in a modified pulse condition to obtain precursor fiber.

The (002) spacing $d_{002}$ of the sample powder thus obtained was 0.3365 nm, and FD value was 1.2.

Embodiment 7

Cylindrical non-aqueous electrolyte secondary battery was made up in a manner similar to the embodiment 5 except that discharge/fiber-forming was carried out in a further modified pulse condition to obtain precursor fiber.

The (002) spacing $d_{002}$ of the sample powder thus obtained was 0.3367 nm, and FD value was 1.3.

Embodiment 8

Cylindrical non-aqueous electrolyte secondary battery was made up in a manner similar to the embodiment 5 except that discharge/fiber-forming was carried out in a still further modified pulse condition to obtain precursor fiber.

The (002) spacing $d_{002}$ of the sample powder thus obtained was 0.3372 nm, and FD value was 1.5.

Embodiment 9

Cylindrical non-aqueous electrolyte secondary battery was made up in a manner similar to the embodiment 5 except that discharge/fiber-forming was carried out in a still more further modified pulse condition to obtain precursor fiber.

The (002) spacing $d_{002}$ of the sample powder thus obtained was 0.3363 nm, and FD value was 1.3.

Comparative Example 4

Cylindrical non-aqueous electrolyte secondary battery was made up in a manner similar to the embodiment 5 except that discharge/fiber-forming was carried out in the state where no ultrasonic wave is applied to the discharge hole to obtain precursor fiber.

The (002) spacing $d_{002}$ of the sample powder thus obtained was 0.3410 nm, and FD value was 1.8.

Comparative Example 5

Cylindrical non-aqueous solution secondary battery was made up in a manner similar to the embodiment 5 except that discharge/fiber-forming was carried out in the state where no ultrasonic wave is applied to the discharge hole to obtain precursor fiber.

The (002) spacing $d_{002}$ of the sample powder thus obtained was 0.3361 nm, and FD value was 1.0.

Figure 17:
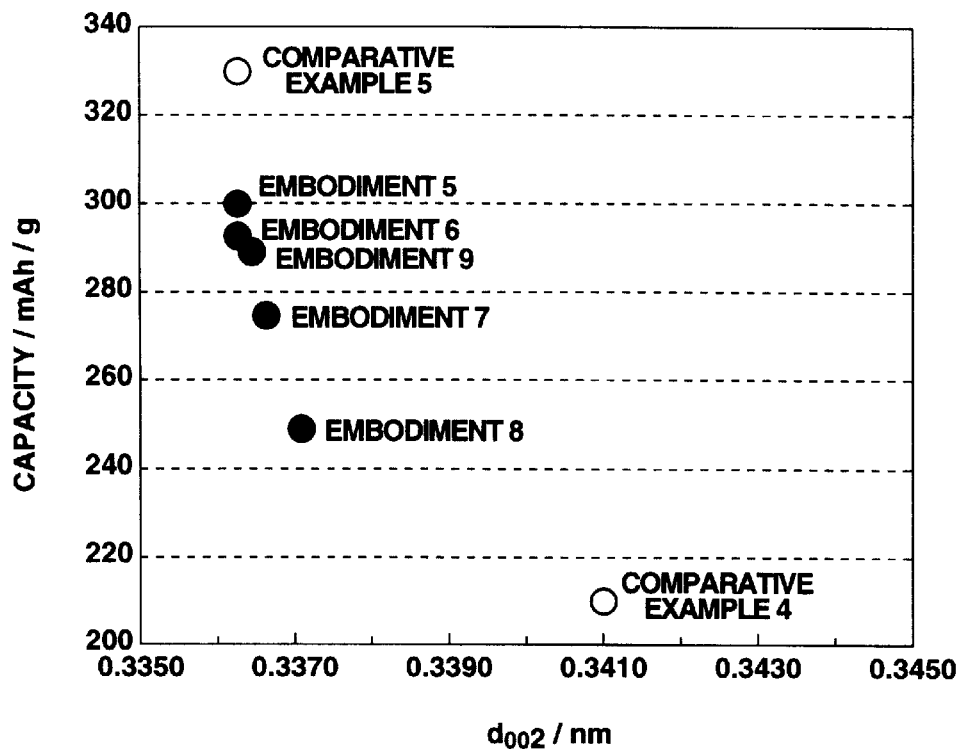
FIG. 17 is a characteristic diagram showing the relationship between spacing of (002) plane of carbon fiber and capacity.

The result in the case where charge/discharge ability was measured with respect to carbon fibers used in the respective embodiments and comparative examples is shown in Table 3. In addition, the relationship between the (002) spacing $d_{002}$ and capacity is shown in FIG. 17.

TABLE 3

| | FIBER CROSS SECTIONAL STRUCTURE | CROSS SECTIONAL DIAMETER DIMENSION μm | FIBER LENGTH μm | FD VALUE | d002 nm | CAPACITY mAh/g | CAPACITY MAINTENANCE RATIO % |
|---|---|---|---|---|---|---|---|
| EMBODIMENT 5 | RANDOM-RADIAL | 21 | 100 | 1.1 | 0.3363 | 300 | 81.7 |
| EMBODIMENT 6 | RANDOM-RADIAL | 22 | 100 | 1.2 | 0.3365 | 290 | 83.1 |
| EMBODIMENT 7 | RANDOM-RADIAL | 23 | 100 | 1.3 | 0.3367 | 275 | 85.3 |
| EMBODIMENT 8 | RANDOM-RADIAL | 24 | 100 | 1.5 | 0.3372 | 250 | 90.3 |
| EMBODIMENT 9 | RANDOM-RADIAL | 26 | 100 | 1.3 | 0.3363 | 292 | 85.6 |
| COMPARATIVE EXAMPLE 4 | RANDOM-RADIAL | 20 | 100 | 1.8 | 0.3410 | 210 | 85.1 |
| COMPARATIVE EXAMPLE 5 | RADIAL | 20 | 100 | 1.0 | 0.3361 | 330 | 68.3 |

The charge/discharge ability measurement method will now be described. Test cell described below was made up to carry out the measurement.

In preparing the test cell, pre-heat processing was first implemented to the above-mentioned sample powder under the condition of temperature rising speed of about 30° C./min., arrival temperature of 600° C. and arrival temperature holding time of one hour in the atmosphere of Ar. Thereafter, polyvinylidene fluoride corresponding to 10% by weight was added as binder to mix dimethyl formamide as solvent to dry it to prepare sample mix. Then, 37 mg of the sample mix was weighted to mold it along with Ni mesh serving as collector so that pellet having diameter of 15.5 mm is provided to make up working electrode.

The configuration of the test cell is as follows.

Cell shape: Coin type cell (diameter 20 mm, thickness 2.5 mm)

Opposite electrode: Li metal

Separator; polypropylene porous film

Electrolytic solution: Solution in which $LiPF_6$ is dissolved in mixed solvent (1:1 in terms of volumetric ratio) of EC and DEC at concentration of 1 mol/l.

The test cell constituted as described above was used to measure capacity per 1 g of carbon material. In this case, doping of lithium into the working electrode (charging: strictly speaking, in this test method, charging is not carried out, but discharging is carried out in the process where lithium is doped into carbon material. However, in correspondence with the actual circumstances at actual battery, for convenience, this doping process is called charging and undoping process is called discharging) was carried out under the condition of constant current of 1 mA and constant voltage of OV (Li/Li+) per cell, and the discharging (undoping process) was carried out under the condition of constant current of 1 mA per cell until terminal voltage falls down to 1.5 V to calculate capacity at that time.

Then, with respect to the tubular (cylindrical) battery made up in the respective embodiments and comparative examples, there was repeatedly carried out charge/discharge cycle in which 2.5 hour constant current and constant voltage charge operation is conducted under the condition of charge current 1 A and the maximum charge voltage of 4.2 V, and discharge operation is then conducted under the condition of current 700 mA until voltage falls down to 2.75 V. Thus, ratio of capacity of the 1 00-th cycle with respect to the capacity of the second cycle (capacity maintenance ratio) was determined.

Figure 18:
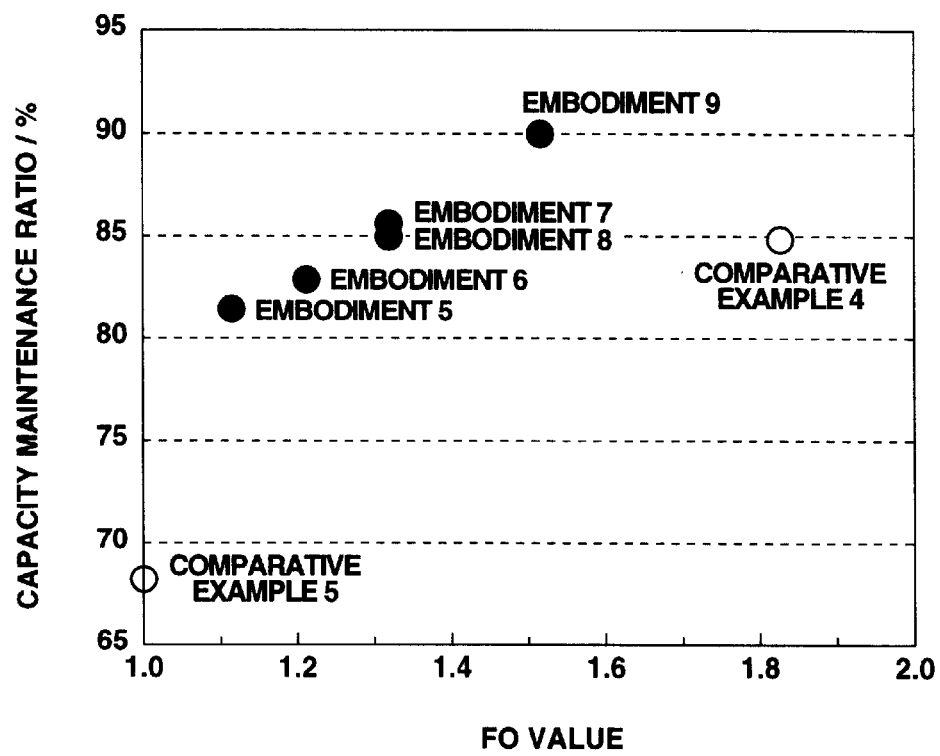
FIG. 18 is a characteristic diagram showing the relationship between fractal dimension value and capacity maintenance ratio.

The result is shown in the above-mentioned Table 3. In addition, the relationship between FD value and capacity maintenance ratio is shown in FIG. 18.

From the above-described result, it has been found that the carbon fiber which has controlled the FD value serving as index of the cross sectional structure of this invention is anode material excellent in the cycle characteristic and the charging/discharging ability as compared to the comparative example.

Difference of the characteristic resulting from difference of the high order structure of the cross section of the carbon fiber was then examined.

Embodiment 10

In this example, anode material was made up in a manner as described below.

Figures 19A, 19B:
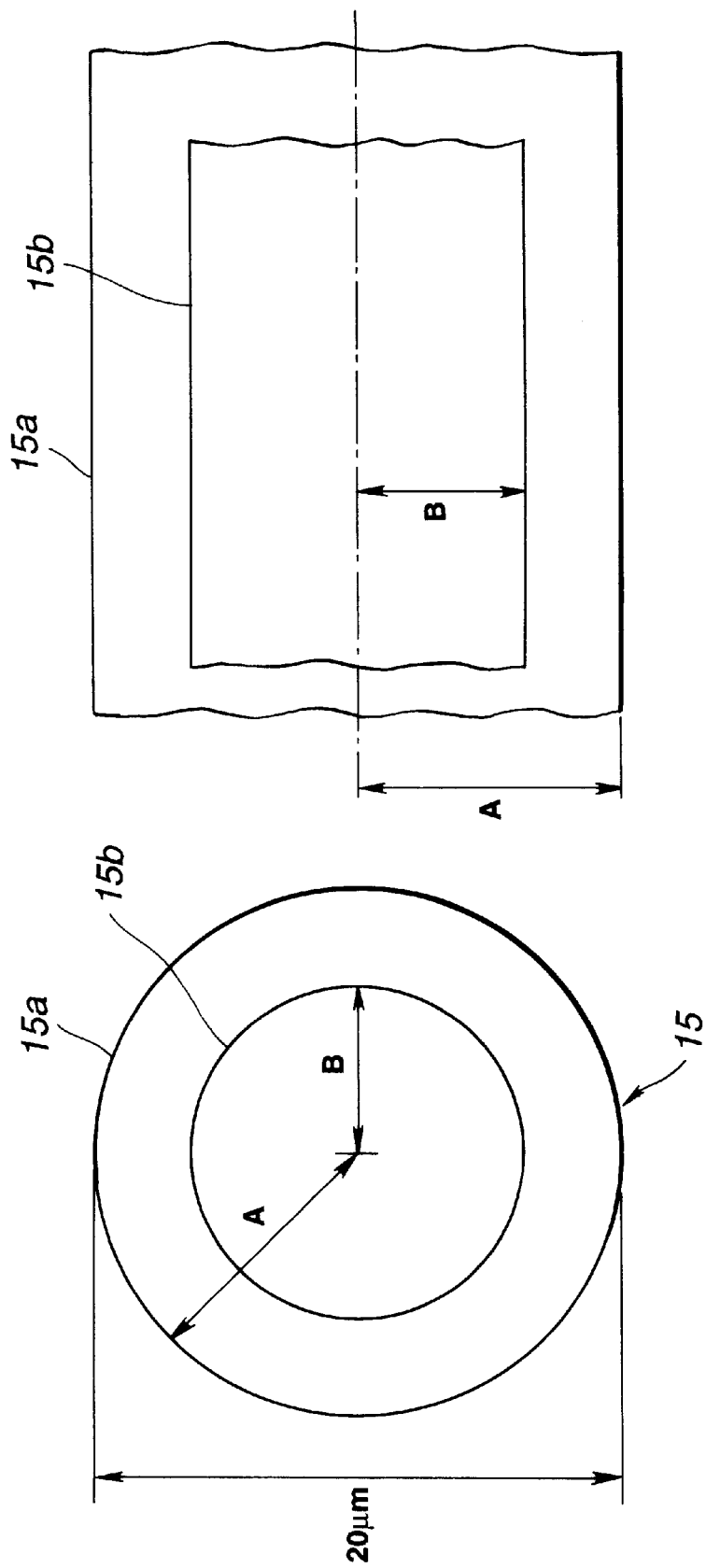
FIG. 19 is a model view showing an example of discharge hole used for producing carbon fiber in which the central portion is of the radial type structure and the surface layer portion is of the random radial type structure.

Coal system pitch was held for five (5) hours at 425° C. in the atmosphere of inactive gas to obtain coal system mesophase pitch having softening point of 220° C. At this time, the mesophase percentage content was 92%. The coal system mesophase pitch thus obtained was caused to undergo fiber-forming by using a discharge tube 15 of the double structure composed of a discharge outer tube 15a and a discharge inner tube 15b as shown in FIG. 19 at 300° C., thus to obtain precursor fiber.

In this example, the diameter A of the discharge outer tube 15a was set to 20 μm, and the diameter B of the discharge inner tube 15b was set to 10 μm (B/A=0.5).

Thereafter, infusible treatment was conducted at 260° C. to calcine the article at temperature 1000° C. in the atmosphere of inactive gas to obtain carbon fiber. Further, heat treatment was conducted at temperature of 3000° C. in the atmosphere of inactive gas to carry out air crushing/milling to obtain sample powder of graphitized carbon fiber. The sample powder thus obtained has cross sectional shape by the electron microscopic observation as shown in FIG. 1.

The above-mentioned sample powder was used as anode material to make up cylindrical non-aqueous electrolyte secondary battery. The method of making up the cathode active material, the method of making up the electrode and the method of assembling the battery are similar to those of the previously described embodiment 1.

Embodiment 11

Cylindrical non-aqueous electrolyte secondary battery was made up in a manner similar to the embodiment 10 except that the discharge hole of B/A=0.7 is used to obtain precursor fiber.

Embodiment 12

Cylindrical non-aqueous electrolyte secondary battery was made up in a manner similar to the embodiment 10 except that discharge hole of B/A=0.3 is used to obtain precursor fiber.

Embodiment 13

Cylindrical non-aqueous electrolyte secondary battery was made up in a manner similar to the embodiment 10 except that discharge hole of B/A=0.1 is used to obtain precursor fiber.

Comparative Example 6

Cylindrical non-aqueous electrolyte secondary battery was made up in a manner similar to the embodiment 10 except that discharge hole of B/A=1 is used to obtain precursor fiber having cross section of random radial structure 100%.

Comparative Example 7

Cylindrical non-aqueous electrolyte secondary battery was made up in a manner similar to the embodiment 10 except that mesophase pitch of mesophase percentage content 98% is used and discharge hole of B/A=1 is used to obtain precursor fiber having cross section of random radial structure 100%.

Test cells similar to those in the case of the embodiments 5 to 9 were made up with respect to carbon fibers used in the respective embodiments and comparative examples to measure charge/discharge ability. The measurement results and the cross sectional shapes are shown in Table 4. The cross sectional shapes were observed by the electron microscope.

Figure 21:
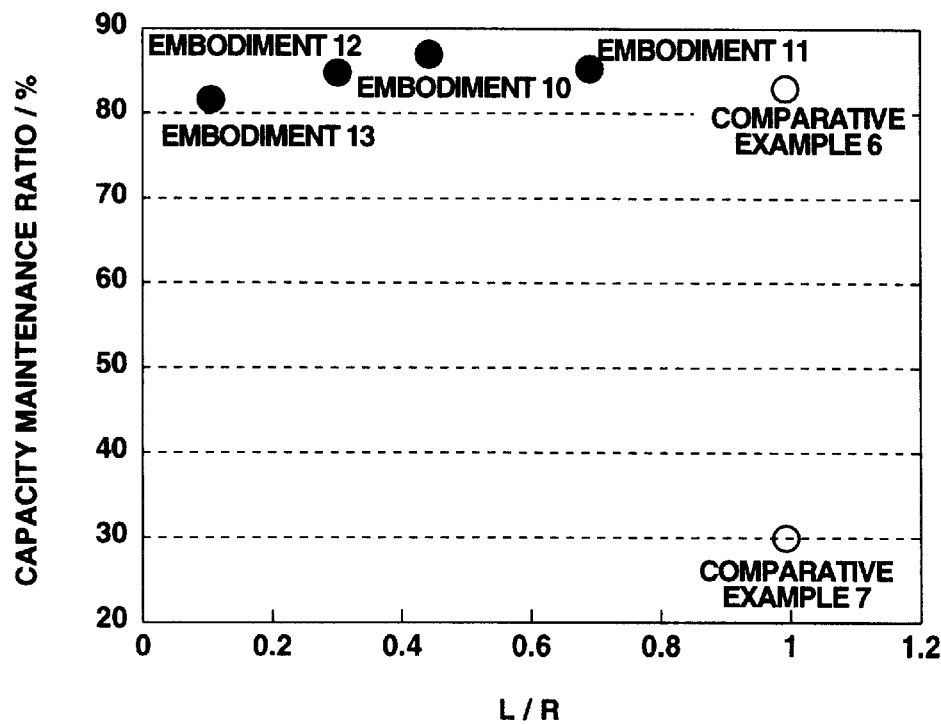
FIG. 21 is a characteristic diagram showing the relationship between ratio of the radial type structure and capacity maintenance ratio.

In addition, charge/discharge cycle is repeatedly carried out to determine ratio of capacity of the 200-th cycle with respect to capacity of the second cycle (capacity maintenance ratio). In the cycle test, charge operation was carried out for 2.5 hours under the condition of the maximum voltage 4.2 V and the charge current 1 A, and discharge operation was carried out under the condition of discharge current of 300 mA until voltage falls down to 2.75 V. The capacity of the second cycle and the capacity maintenance ratio of the 200-th cycle with respect to the second cycle are shown in the above-mentioned table 4 and FIG. 21.

From the above-described result, it has been found that the carbon fiber in which the central portion is of the radial type structure and the surface layer portion is of the random radial structure can provide battery having well-balanced relationship between the battery capacity and cycle characteristic, high energy density, excellent cycle characteristic, and high reliability as compared to the comparative example.

The characteristic of the carbon fiber having notch structure was then examined.

Embodiment 14

Anode material was produced in a manner as described below.

Coal system pitch was held for five (5) hours at 425° C. in the atmosphere of inactive gas to obtain coal system mesophase pitch having softening point 220° C. At this time, the mesophase percentage content was 92%. The coal system mesophase pitch thus obtained was caused to undergo fiber-forming by using discharge hole (angle that baffle plate J forms is 3°) having diameter of 20 μm, which has shape shown in FIG. 3, at 300° C. to obtain precursor fiber.

TABLE 4

| | SHAPE | CROSS SECTIONAL DIAMETER DIMENSION μm | FIBER LENGTH μm | CHARGE/ DISCHARGE ABILITY mAh g | BATTERY CAPACITY mAh | CAPACITY MAINTE- NANCE RATIO % |
|---|---|---|---|---|---|---|
| EMBODIMENT 10 | L/R = 0.45 SURFACE LAYER PORTION IS RANDOM RADIAL, CENTRAL PORTION IS RADIAL | 20 | 100 | 315 | 1450 | 87 |
| EMBODIMENT 11 | L/R = 0.68 SURFACE LAYER PORTION IS RANDOM RADIAL, CENTRAL PORTION IS RADIAL | 20 | 100 | 323 | 1472 | 85 |
| EMBODIMENT 12 | L/R = 0.31 SURFACE LAYER PORTION IS RANDOM RADIAL, CENTRAL PORTION IS RADIAL | 20 | 100 | 309 | 1436 | 85 |
| EMBODIMENT 13 | L/R = 0.11 SURFACE LAYER PORTION IS RANDOM RADIAL, CENTRAL PORTION IS RADIAL | 20 | 100 | 303 | 1422 | 82 |
| COMPARATIVE EXAMPLE 6 | RANDOM RADIAL | 20 | 100 | 300 | 1410 | 84 |
| COMPARATIVE EXAMPLE 7 | RADIAL | 20 | 100 | 330 | 1485 | 30 |

Figure 20:
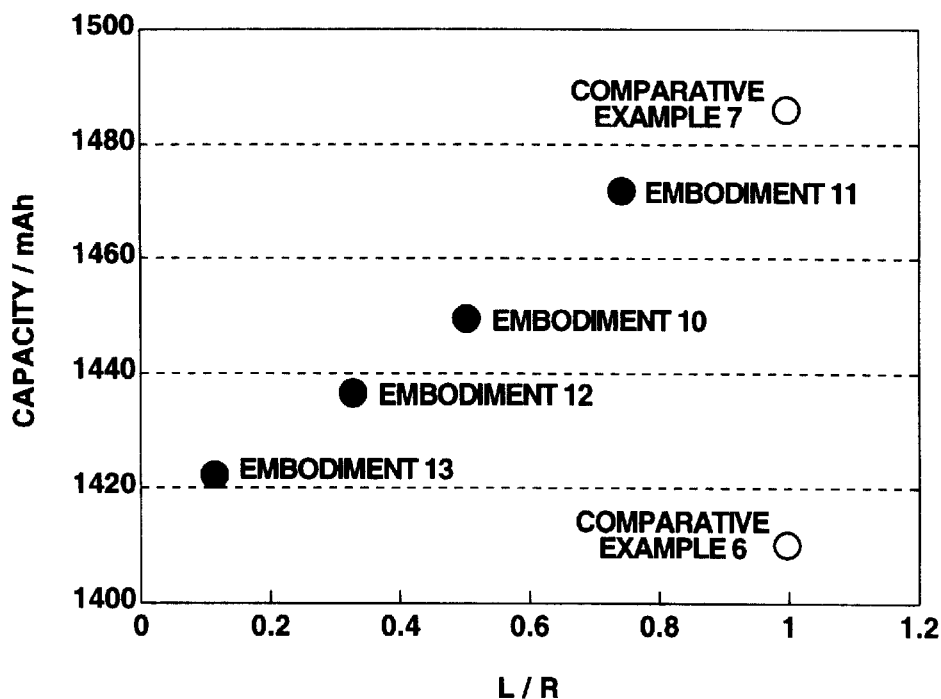
FIG. 20 is a characteristic diagram showing the relationship between ratio of the radial type structure and capacity.

Further, 2.5 hour constant current/constant voltage charge operation was carried out under the condition of charge current of 1 A and the maximum charge voltage of 4.2 V with respect to tubular (cylindrical) batteries made up in the respective embodiments and comparative examples thereafter to carry out discharge operation under the condition of discharge current 700 mA until voltage falls down to 2.75 V to measure the battery initial capacity. Its result is shown in the Table 4 and FIG. 20.

Thereafter, infusible processing was conducted at 260° C. to calcine the article at temperature 1000° C. in the atmosphere of inactive gas to obtain carbon fiber. Notch angle of the fiber measured by the electron microscopic picture image was 2°. Further, heat treatment was conducted at temperature of 3000° C. in the atmosphere of inactive gas to carry out air crushing/milling. Thus, sample powder of graphitized carbon fiber was obtained.

The above-mentioned sample powder was used as the anode material to make up cylindrical non-aqueous electrolyte secondary battery. The method of making up cathode material, the method of making up electrode and the method of assembling battery are similar to those of the previously described embodiment 1.

Embodiment 15

Cylindrical non-aqueous electrolyte secondary battery was made up in a manner similar to the embodiment 14 except that the discharge hole in which angle that baffle plate J forms is 10° is used to obtain precursor fiber (notch angle is 8°).

Embodiment 16

Cylindrical non-aqueous electrolyte secondary battery was made up in a manner similar to the embodiment 14 except that the discharge hole in which angle that baffle plate J forms is 30° C. is used to obtain precursor fiber (notch angle is 28°).

Embodiment 17

Cylindrical non-aqueous electrolyte secondary battery was made up in a manner similar to the embodiment 14 except that the discharge hole in which angle that baffle plate J forms is 50° is used to obtain precursor fiber (notch angle is 47°)

Comparative Example 9

Cylindrical non-aqueous electrolyte secondary battery was made up in a manner similar to the embodiment 14 except that pich in which the mesophase percentage ratio is 30% is used and discharge hole including no baffle plate J is used to obtain precursor fiber (no notch).

Comparative Example 10

Cylindrical non-aqueous electrolyte secondary battery was made up in a manner similar to the embodiment 14 except that the discharge hole in which angle that baffle plate J forms is 145° is used to obtain precursor fiber (notch angle is 140°).

Figure 22:
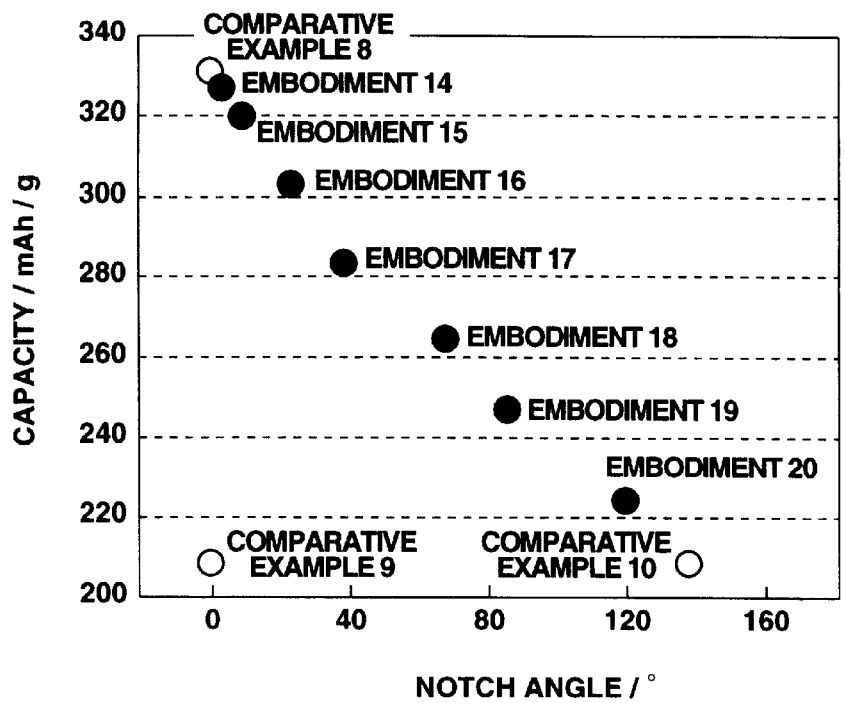
FIG. 22 is a characteristic diagram showing the relationship between notch angle in carbon fiber having notch structure and capacity.

Test cells similar to those in the cases of the embodiments 5 to 9 were made up with respect to the carbon fibers used in the respective embodiments and comparative examples to measure charge/discharge ability. Its measured result is shown in Table 5. In addition, the relationship between notch angle and capacity is shown in FIG. 22.

TABLE 5

| | FIBER CROSS SECTIONAL STRUCTURE | CROSS SECTIONAL DIAMETER DIMENSION $\mu$m | FIBER LENGTH $\mu$m | NOTCH ANGLE ° | CAPACITY mAh/g | CAPACITY MAINTENANCE RATIO % |
|---|---|---|---|---|---|---|
| EMBODIMENT 14 | RADIAL | 20 | 100 | 2 | 327 | 80.3 |
| EMBODIMENT 15 | RADIAL | 20 | 100 | 8 | 321 | 85.2 |
| EMBODIMENT 16 | RADIAL | 20 | 100 | 28 | 303 | 92.5 |
| EMBODIMENT 17 | RADIAL | 20 | 100 | 43 | 284 | 91.5 |
| EMBODIMENT 18 | RADIAL | 20 | 100 | 72 | 266 | 92.0 |
| EMBODIMENT 19 | RADIAL | 20 | 100 | 88 | 248 | 91.3 |
| EMBODIMENT 20 | RADIAL | 20 | 100 | 120 | 223 | 88.2 |
| COMPARATIVE EXAMPLE 8 | RADIAL | 20 | 100 | NONE | 331 | 72.1 |
| COMPARATIVE EXAMPLE 9 | RANDOM | 20 | 100 | NONE | 210 | 85.0 |
| COMPARATIVE EXAMPLE 10 | RADIAL | 20 | 100 | 140 | 209 | 80.0 |

Embodiment 18

Cylindrical non-aqueous electrolyte secondary battery was made up in a manner similar to the embodiment 14 except that the discharge hole in which angle that baffle plate J forms is 70° is used to obtain precursor fiber (notch angle is 72°).

Embodiment 19

Cylindrical non-aqueous electrolyte secondary battery was made up in a manner similar to the embodiment 14 except that the discharge hole in which angle that baffle plate J forms is 90° is used to obtain precursor fiber (notch angle is 88°).

Embodiment 20

Cylindrical non-aqueous electrolyte secondary battery was made up in a manner similar to the embodiment 14 except that the discharge hole in which angle that baffle plate J forms is 125° is used to obtain precursor fiber (notch angle is 120°).

Comparative Example 8

Cylindrical non-aqueous electrolyte secondary battery was made up in a manner similar to the embodiment 14 except that the discharge hole including no baffle plate J is used to obtain precursor fiber (no notch).

Figure 23:
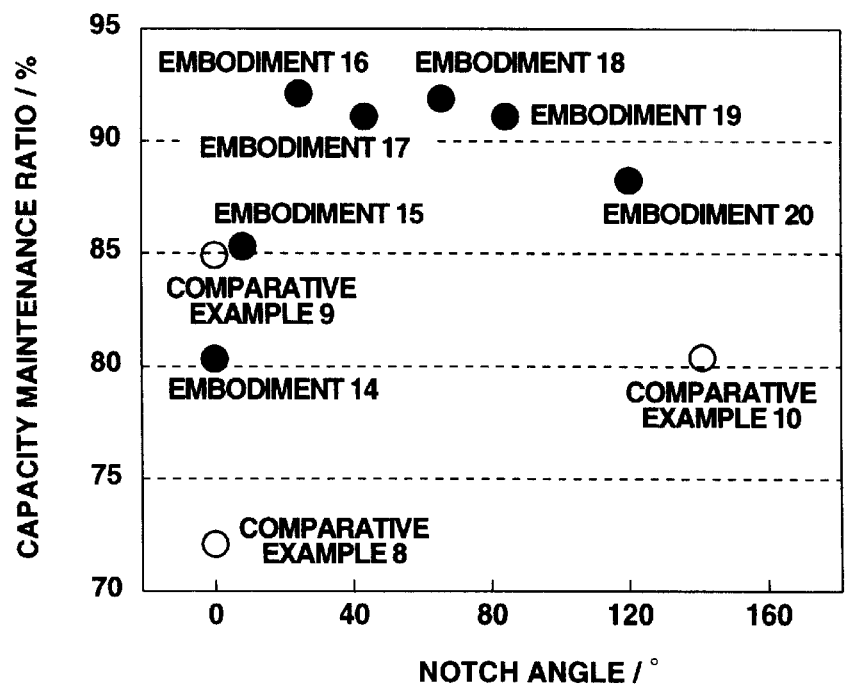
FIG. 23 is a characteristic diagram showing the relationship between notch angle in carbon fiber having notch structure and capacity maintenance ratio.

Further, with respect to the tubular (cylindrical) batteries made up in the respective embodiments and comparative examples, there was repeatedly carried out charge/discharge cycle in which 2.5 hour constant current/constant voltage charge operation is then carried out under the conditions of the charge current of 1 A and the maximum charge voltage of 4.2 V and discharge operation is carried out under the condition of discharge current 700 mA until voltage falls down to 2.75 V. Thus, ratio of capacity of the 100-th cycle with respect to capacity of the second cycle (capacity maintenance ratio) was determined. The result of the capacity maintenance ratio of the 100-th cycle with respect to the second cycle is shown in the above-mentioned table 5. In addition, the relationship between notch angle and capacity maintenance ratio is shown in FIG. 23.

From the above-described result, it has been found that notch is provided at carbon fiber so that anode material excellent in the cycle characteristic is provided.

The performance as the anode material of the carbon material formed by crushing carbon fiber having cross sectional portions in which crystal structures are different periodically in the fiber length direction.

Embodiment 21

Anode material was produced in a manner as described below.

Petroleum system pitch was held for five (5) hours at 425° C. in the atmosphere of inactive gas to obtain petroleum system mesophase pitch having softening point 230° C. At this time, the mesophase percentage ratio was 91%. The petroleum system mesophase pitch thus obtained was caused to undergo discharge and fiber-forming at a predetermined extraction pressure at 300° C. while applying magnetic field in a pulse form every predetermined time interval by using discharge hole having inner diameter of 20 μm within which small probe for application of magnetic field is included. Thus, organic fiber was obtained. Thereafter, this organic fiber was caused to experience infusible processing at 260° C. to calcine it at temperature of 1000° C. in the atmosphere of inactive gas to obtain carbon fiber. Further, the carbon fiber thus obtained is heat-processed at temperature 3000° C. in the atmosphere of inactive gas to allow it to be precursor graphitized fiber as shown in FIG. 4a to further air-crush the precursor graphitized fiber to allow it to be sample powder as shown in FIG. 4b. The aspect ratio of the sample powder thus obtained was expressed as A=1.3 and the specific surface area was 0.9 mm²/g.

The above-mentioned sample powder was used as anode material to make up tubular (cylindrical) non-aqueous electrolyte secondary battery. The method of making up the cathode active material, the method of making up electrode and the method of assembling battery are similar to those of the previously described embodiment 1.

Embodiment 22

Cylindrical non-aqueous electrolyte secondary battery was made up in a manner similar to the embodiment 21 except that discharge/fiber-forming is carried out in the modified application pulse condition of magnetic field to obtain organic fiber. The aspect ratio of the sample powder thus obtained was expressed as A=3.3 and the specific surface area thereof was 0.8 m²/g.

Embodiment 23

Cylindrical non-aqueous electrolyte secondary battery was made up in a manner similar to the embodiment 21 except that discharge/fiber-forming is carried out in the further modified application pulse condition of magnetic field to obtain organic fiber. The aspect ratio of the sample powder thus obtained was expressed as A=7.0 and the specific surface area thereof was 1.2 m²/g.

Embodiment 24

Cylindrical non-aqueous electrolyte secondary battery was made up in a manner similar to the embodiment 21 except that ultrasonic wave is applied to the discharge hole front end in a pulse form in place of magnetic field to carry out discharge/fiber-forming to obtain organic fiber. The aspect ratio of the sample powder thus obtained was expressed as A=9.3 and the specific surface area was 1.3 m²/g.

Embodiment 25

Cylindrical non-aqueous electrolyte secondary battery was made up in a manner similar to the embodiment 21 except that discharge hole having fine holes therewithin is used in place of magnetic field to carry out discharge/fiber-forming while ejecting air in a pulse form from the fine holes to obtain organic fiber. The aspect ratio of the sample powder thus obtained was expressed as A=41.0 and the specific surface area thereof was 1.5 m²/g.

Comparative Example 11

Cylindrical non-aqueous electrolyte secondary battery was made up in a manner similar to the embodiment 21 except that no magnetic field is applied to the discharge hole. The aspect ratio of the sample powder thus obtained was expressed as A=64 and the specific surface area was 2.0 m²/g.

Test cells similar to the cases of the embodiments 5 to 9 were made up with respect to carbon fibers used in the respective embodiments and the comparative examples to measure charge/discharge ability (capacity). In addition, in the test cell, value obtained by subtracting discharge capacity from charge capacity was calculated as capacity loss. The measured result is shown in Table 6.

TABLE 6

| | FIBER CROSS SECTIONAL STRUCTURE | FIBER DIAMETER L/μm | FIBER LENGTH T/μm | ASPECT RATIO A | SPECIFIC SURFACE AREA m²/g | CAPACITY mAh/g | CAPACITY LOSS mAh/g | CAPACITY MAINTENANCE RATIO % |
|---|---|---|---|---|---|---|---|---|
| EMBODIMENT 21 | RANDOM-RADIAL | 19 | 25 | 1.3 | 0.9 | 280 | 20 | 93 |
| EMBODIMENT 22 | RANDOM-RADIAL | 19 | 63 | 3.3 | 0.8 | 280 | 15 | 92 |
| EMBODIMENT 23 | RANDOM-RADIAL | 21 | 148 | 7.0 | 1.2 | 280 | 25 | 88 |
| EMBODIMENT 24 | RANDOM-RADIAL | 20 | 186 | 9.3 | 1.3 | 280 | 25 | 85 |
| EMBODIMENT 25 | RANDOM-RADIAL | 23 | 950 | 41.0 | 1.5 | 280 | 30 | 80 |
| COMPARATIVE EXAMPLE 11 | RANDOM-RADIAL | 20 | 1280 | 64.0 | 2.0 | 280 | 50 | 70 |

Figure 24:
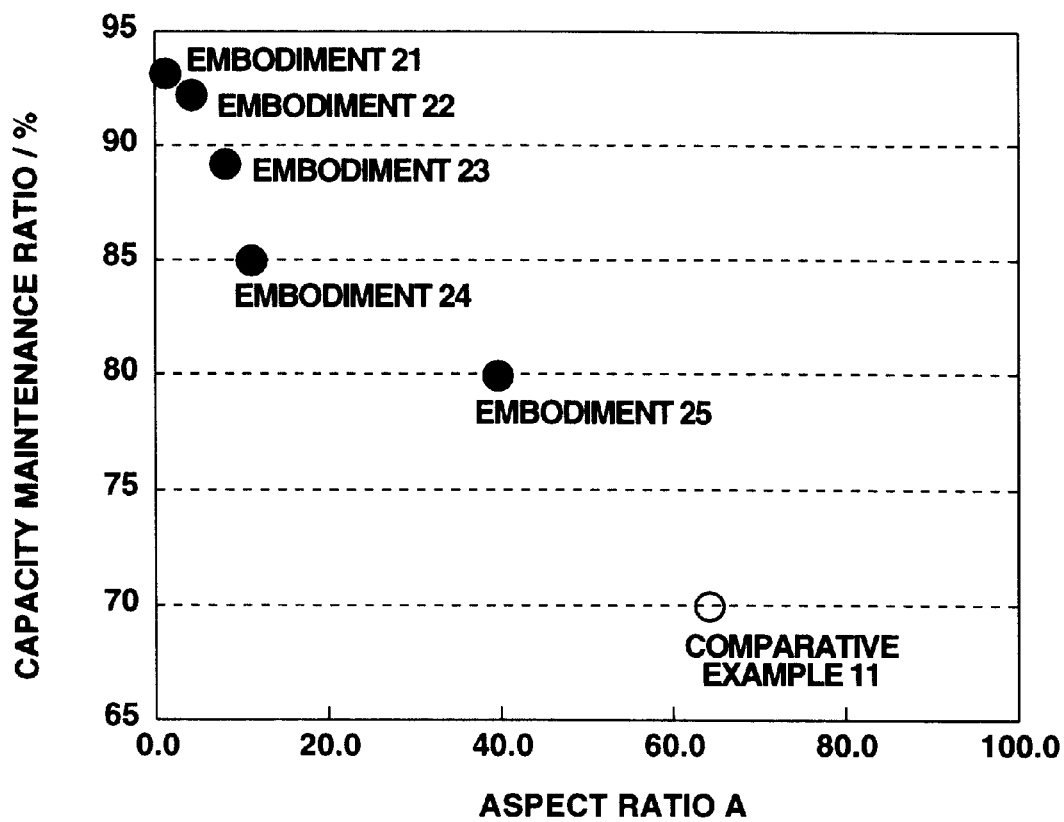
FIG. 24 is a characteristic diagram showing the relationship between aspect ratio of carbon fiber crushed powder and capacity maintenance ratio.

Further, with respect to cylindrical batteries made up in the respective embodiments and the comparative examples, there was repeatedly carried out charge/discharge cycle in which 2.5 hour constant current/constant voltage charge operation is conducted under the condition of charge current of 1 A and the maximum charge voltage of 4.2 V, and discharge operation is then conducted under the condition of discharge current 700 mA until voltage falls down to 2.75 V to determine ratio of capacity of the 100-th cycle with respect to capacity of the second cycle (capacity maintenance ratio). The result of the capacity maintenance ratio of the 200-th cycle with respect to the second cycle is shown in the above-mentioned Table 6. In addition, the relationship between the aspect ratio A and the capacity maintenance ratio is shown in FIG. 24.

From the above-described result, it has been found that carbon fiber having cross sectional portions different in the crystal structure periodically in the fiber length direction is crushed, thereby making it possible to easily realize low aspect ratio, and that in the case where such crushed powder is used as anode material, non-aqueous electrolyte secondary battery excellent in the cycle characteristic can be obtained.

What is claimed is:

1. An anode material for a non-aqueous electrolyte secondary battery comprising carbon fiber capable of carrying out doping/undoping of lithium, the carbon fiber having an area replenishment rate of at least 0.8, the area replenishment rate being defined by dividing an area of a cross section of the carbon fiber by a minimum area of a circumscribed rectangle surrounding the cross section, the carbon fiber further being comprised of graphitized carbon fiber, the graphitized carbon fiber having a true density of at least 2.1 g/cm$^3$.

2. The anode material for the non-aqueous electrolyte secondary battery as set forth in claim 1. wherein a circularity is defined by dividing a circumferential length of a circle by a contour length of the cross section of carbon fiber, the circle having a same area as that of the cross section of the carbon fiber, the circularity being at least 0.8 and less than 1.0.

3. The anode material for the non-aqueous electrolyte secondary battery as set forth in claim 1, wherein a bulk density of the graphitized carbon fiber is at least 0.4 g/cm$^3$.

4. The anode material for the non-aqueous electrolyte secondary battery as set forth in claim 1, wherein a specific surface area of the graphitized carbon fiber is up to and including 9 m$^2$/g.

5. The anode material for the non-aqueous electrolyte secondary battery as set forth in claim 1, wherein the graphitized carbon fiber has a grain size distribution wherein an accumulated 10% particle diameter is at least 3 μm, an accumulated 50% particle diameter is at least 10 μm, and an accumulated 90% particle diameter is up to and including 70 μm.

6. The anode material for the non-aqueous electrolyte secondary battery as set forth in claim 1, wherein the carbon fiber has a thickness T of the thinnest portion of carbon fiber, an axis length L in a long axis and length W in a direction perpendicular to the long axis, the carbon fiber further having a shape parameter X up to and including 125 calculated by the following formula:

$$X=(W/T)\times(L/T).$$

7. A non-aqueous electrolyte secondary battery comprising:

an anode comprising carbon material, the carbon material being capable of carrying out doping/undoping of lithium, the battery further comprising a cathode, and a non-aqueous electrolytic solution in which an electrolyte is dissolved in a non-aqueous solvent, the carbon material comprising carbon fiber, the carbon fiber having an area replenishment rate of at least 0.8, the area replenishment rate defined by dividing an area of a cross section of the carbon fiber by a minimum area of a circumscribed rectangle surrounding the cross section, the carbon fiber further being comprised of graphitized carbon fiber, the graphitized carbon fiber having a true density of at least 2.1 g/cm$^3$.

* * * * *